(12) United States Patent
Scheich

(10) Patent No.: US 12,316,945 B2
(45) Date of Patent: May 27, 2025

(54) VEHICLE PHOTOGRAPHIC CHAMBER

(71) Applicant: Carvana, LLC, Tempe, AZ (US)

(72) Inventor: Davo Scheich, Troy, MI (US)

(73) Assignee: Carvana, LLC, Tempe, AZ (US)

( * ) Notice: Subject to any disclaimer, the term of this patent is extended or adjusted under 35 U.S.C. 154(b) by 0 days.

(21) Appl. No.: 18/545,424

(22) Filed: Dec. 19, 2023

(65) Prior Publication Data

US 2024/0121498 A1 Apr. 11, 2024

Related U.S. Application Data

(63) Continuation of application No. 17/151,188, filed on Jan. 17, 2021, now Pat. No. 11,856,282, which is a
(Continued)

(51) Int. Cl.
*G06K 9/00* (2022.01)
*G06F 16/51* (2019.01)
(Continued)

(52) U.S. Cl.
CPC ............. *H04N 23/56* (2023.01); *G06F 16/51* (2019.01); *G06F 16/5862* (2019.01);
(Continued)

(58) Field of Classification Search
CPC .. H04N 5/2256; H04N 13/239; H04N 5/2251; H04N 5/2354; H04N 23/56;
(Continued)

(56) References Cited

U.S. PATENT DOCUMENTS 967,025 A 8/1910 Leonard et al.
4,545,630 A 10/1985 Izumi et al.
(Continued)

FOREIGN PATENT DOCUMENTS

CN 207560161 U 6/2018
DE 202017002782 U1 6/2017
(Continued)

OTHER PUBLICATIONS

In Re Venner et al., No. 6391, LexisNexis; United States Court of Customs and Patent Appeals; Oral argument Nov. 7, 1958, Dec. 19, 1958.
(Continued)

*Primary Examiner* — Duy M Dang
(74) *Attorney, Agent, or Firm* — SNELL & WILMER L.L.P.

(57) ABSTRACT

A circular dome for photographing vehicles includes curved frames that support a skin. Contoured walls offset from the curved frames to define a recess adapted to receive cameras and lights for photographing vehicles around a perimeter of the dome. A door matching the contour of the curved frames completes the dome and is size to receive a vehicle, to collectively implement subtractive lighting along the perimeter of the dome. A system and method are provided for automatically photographing vehicles in an enclosable circular domed structure where an automated process captures a series of vehicle images and uploads the captured images to a web template for display and recordation.

20 Claims, 16 Drawing Sheets

Related U.S. Application Data continuation of application No. 15/834,374, filed on Dec. 7, 2017, now Pat. No. 10,939,023.

(60) Provisional application No. 62/431,000, filed on Dec. 7, 2016.

(51) Int. Cl.
| | |
|---|---|
| *G06F 16/583* | (2019.01) |
| *G06T 1/00* | (2006.01) |
| *H04N 13/239* | (2018.01) |
| *H04N 23/50* | (2023.01) |
| *H04N 23/56* | (2023.01) |
| *H04N 23/60* | (2023.01) |
| *H04N 23/74* | (2023.01) |
| *H04N 23/90* | (2023.01) |

(52) U.S. Cl.
CPC ......... *G06T 1/0007* (2013.01); *H04N 13/239* (2018.05); *H04N 23/50* (2023.01); *H04N 23/60* (2023.01); *H04N 23/74* (2023.01); *H04N 23/90* (2023.01)

(58) Field of Classification Search
CPC ........ H04N 23/50; H04N 23/60; H04N 23/74; H04N 23/90; G03B 17/561; G03B 15/00; G03B 15/02; G03B 15/06; G06F 16/51; G06F 16/5862; G06T 1/0007
See application file for complete search history.

(56) References Cited

U.S. PATENT DOCUMENTS

| | | |
|---|---|---|
| 4,804,983 A | 2/1989 | Thayer |
| 4,918,321 A | 4/1990 | Klenk et al. |
| 5,436,726 A | 7/1995 | Ventura et al. |
| 5,446,515 A | 8/1995 | Wolfe |
| 5,636,024 A | 6/1997 | Crookham et al. |
| 5,726,705 A | 3/1998 | Imanishi et al. |
| 5,778,258 A | 7/1998 | Zamoyski |
| 6,012,825 A | 1/2000 | Horner et al. |
| 6,147,752 A | 11/2000 | Hewitt et al. |
| 6,266,138 B1 | 7/2001 | Keshavmurthy |
| 6,320,654 B1 | 11/2001 | Alders et al. |
| 6,513,941 B1 | 2/2003 | Perrier et al. |
| 6,778,097 B1 | 8/2004 | Kajita et al. |
| 6,901,384 B2 | 5/2005 | Lynch et al. |
| 6,950,807 B2 | 9/2005 | Brock |
| 7,012,637 B1 | 3/2006 | Blume et al. |
| 7,212,308 B2 | 5/2007 | Morgan |
| 7,954,953 B2 | 6/2011 | Sprague |
| 8,050,735 B2 | 11/2011 | Feke et al. |
| 8,112,325 B2 | 2/2012 | Foy et al. |
| 9,037,968 B1 | 5/2015 | Pringle et al. |
| 9,046,740 B1 | 6/2015 | Smithweck |
| 9,113,784 B2 | 8/2015 | Feke et al. |
| 9,302,190 B1 | 4/2016 | Jennings |
| 9,412,203 B1 | 8/2016 | Garcia |
| 9,429,817 B1 | 8/2016 | Harder et al. |
| 10,063,758 B2 | 8/2018 | Scheich |
| 10,311,636 B1 | 6/2019 | Falstrup et al. |
| 10,814,800 B1 | 10/2020 | Gould |
| 10,824,055 B1 | 11/2020 | Mcguire |
| 11,412,135 B2 | 8/2022 | Scheich |
| 11,720,005 B2 | 8/2023 | Scheich |
| 11,892,757 B2 | 2/2024 | Scheich |
| 2001/0020933 A1 | 9/2001 | Maggioni |
| 2002/0082860 A1 | 6/2002 | Johnson |
| 2002/0085219 A1 | 7/2002 | Ramamoorthy |
| 2002/0105513 A1 | 8/2002 | Chen |
| 2002/0145660 A1 | 10/2002 | Kanade et al. |
| 2003/0107568 A1 | 6/2003 | Urisaka et al. |
| 2004/0078298 A1 | 4/2004 | Fusama |
| 2006/0114531 A1 | 6/2006 | Webb et al. |
| 2006/0182308 A1 | 8/2006 | Gerlach et al. |
| 2006/0185550 A1 | 8/2006 | Zanzucchi et al. |
| 2006/0256959 A1 | 11/2006 | Hymes |
| 2007/0011083 A1 | 1/2007 | Bird et al. |
| 2007/0035539 A1 | 2/2007 | Matsumura et al. |
| 2007/0057815 A1 | 3/2007 | Foy et al. |
| 2007/0172216 A1 | 7/2007 | Lai |
| 2007/0211240 A1 | 9/2007 | Matsumoto et al. |
| 2007/0230824 A1 | 10/2007 | Alvarez |
| 2008/0106593 A1 | 5/2008 | Arfvidsson et al. |
| 2008/0187182 A1 | 8/2008 | Abe |
| 2008/0250585 A1 | 10/2008 | Auer et al. |
| 2009/0043206 A1 | 2/2009 | Towfiq et al. |
| 2009/0160930 A1 | 6/2009 | Ruppert |
| 2010/0067801 A1 | 3/2010 | Van Den Hengel et al. |
| 2010/0238290 A1 | 9/2010 | Riley et al. |
| 2010/0306413 A1 | 12/2010 | Kamay |
| 2011/0080487 A1 | 4/2011 | Venkataraman et al. |
| 2011/0102744 A1 | 5/2011 | Saad et al. |
| 2011/0221904 A1 | 9/2011 | Swinford |
| 2012/0087643 A1 | 4/2012 | Paramadilok |
| 2013/0057678 A1 | 3/2013 | Prior et al. |
| 2013/0107041 A1 | 5/2013 | Norem et al. |
| 2014/0009275 A1 | 1/2014 | Bowers et al. |
| 2014/0118807 A1 | 5/2014 | Su |
| 2014/0152806 A1 | 6/2014 | Hauk |
| 2014/0192181 A1 | 7/2014 | Taylor et al. |
| 2014/0235362 A1 | 8/2014 | Fox et al. |
| 2014/0268627 A1 | 9/2014 | Contreras et al. |
| 2015/0012168 A1 | 1/2015 | Kuklish et al. |
| 2015/0077564 A1 | 3/2015 | Swindord |
| 2015/0111601 A1 | 4/2015 | Fagan |
| 2015/0227296 A1 | 8/2015 | Pringle et al. |
| 2016/0001184 A1 | 1/2016 | Sepulveda et al. |
| 2016/0100087 A1 | 4/2016 | Scheich |
| 2017/0051547 A1 | 2/2017 | Albrecht |
| 2017/0148102 A1 | 5/2017 | Franke et al. |
| 2017/0171570 A1 | 6/2017 | Mitsumoto |
| 2017/0180696 A1 | 6/2017 | Broughton |
| 2017/0264936 A1 | 9/2017 | Depies et al. |
| 2018/0084224 A1 | 3/2018 | Mcnelley et al. |
| 2018/0160019 A1 | 6/2018 | Scheich |
| 2019/0011806 A1 | 1/2019 | Zilban et al. |
| 2019/0056483 A1 | 2/2019 | Bradley et al. |
| 2019/0235737 A1 | 8/2019 | Kuribayashi |
| 2019/0244336 A1 | 8/2019 | Wakisaka et al. |
| 2019/0253701 A1 | 8/2019 | Himel et al. |
| 2020/0173930 A1 | 6/2020 | Alonie et al. |
| 2021/0144282 A1 | 5/2021 | Scheich |
| 2022/0060633 A1 | 2/2022 | Dillow |
| 2022/0066294 A1 | 3/2022 | Scheich |
| 2022/0101558 A1 | 3/2022 | Mahajan et al. |
| 2022/0405519 A1 | 12/2022 | Guzik et al. |
| 2023/0007934 A1 | 1/2023 | Swinford |

FOREIGN PATENT DOCUMENTS

| | | |
|---|---|---|
| JP | S56132509 A | 10/1981 |
| JP | 2001013578 A | 1/2001 |
| WO | 2005022252 A1 | 3/2005 |
| WO | 2021021864 A1 | 2/2021 |

OTHER PUBLICATIONS

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6V1j,b7jJcq29,w; accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D.C. 20549; Form 10-K; Annual Report Pursuant to Section 13 or 15(d) of the

(56) References Cited

OTHER PUBLICATIONS

Securities Exchange Act of 1934. http://www.ir.creditacceptance.com/secfiling.cfm?filing1D=885550-13-18&CIK=885550; accessed Dec. 17, 2013.

(Detail A)

VEHICLE PHOTOGRAPHIC CHAMBER

CROSS-REFERENCE TO RELATED APPLICATIONS

This application is a continuation of, and claims priority to, U.S. application Ser. No. 17/151,188, titled VEHICLE PHOTOGRAPHIC CHAMBER and filed on Jan. 17, 2021. U.S. application Ser. No. 17/151,188 is a continuation of U.S. application Ser. No. 15/834,374, filed Dec. 7, 2017 and titled VEHICLE PHOTOGRAPHIC CHAMBER. U.S. application Ser. No. 15/834,374, in turn, claims the benefit of U.S. Provisional Patent Application Ser. No. 62/431,000, filed Dec. 7, 2016 and titled VEHICLE PHOTOGRAPHIC CHAMBER.

U.S. application Ser. No. 17/151,188, U.S. application Ser. No. 15/834,374, and U.S. Provisional Patent Application Ser. No. 62/431,000 are herein incorporated by this reference in their entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FIELD OF THE INVENTION

The present invention in general relates to a system for photographing vehicles; and in particular, to an enclosable domed structure where an automated process captures a series of vehicle images and uploads the captured images to a web template for display and recordation.

BACKGROUND OF THE INVENTION

Auto auctions play a major role as a wholesale market for second-hand vehicles. Most auto auctions are closed auctions, meaning only dealers can use them. There are also auctions that are open to the public. These auctions are a primary outlet for financial services firms to dispose of their large volume of off-lease returns, for rental and other companies to sell off their aging fleets, and for car dealerships to dump trade-ins or other unwanted inventory. Some auctions are used by banks, the Internal Revenue Service, and other government agencies to sell vehicles that were repossessed for failure to make monthly payments or pay taxes, or were seized by the government agencies, or the police. Auctions are also used to sell U.S. Government vehicles.

Online auto auctions have also been growing in popularity. One of the most popular online auctions to buy vehicles from is eBay™. On eBay Motors™, a user can create an account and put their vehicles up for auction. Other popular websites include Cars.com™ Typically, online vehicle sales are based solely on images of the vehicle, since the buyer is in a remote location and is unable to view the vehicle in question in person. Thus, many high quality images are required of the vehicle from many perspectives to allow a buyer to gain an understanding of a subject vehicle's condition and appearance. FIGS. 1A and 1B are typical non-studio quality vehicle photographs that are used to list vehicles for sale. The images shown in FIGS. 1A and 1B are of low quality and require a dedicated employee to move vehicles and physically move around the subject vehicle to take the pictures. The photographer also has to manually collate the images, name, and upload the files, which is a labor intensive and time consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however, reflection free images are critical to be able to discern surface imperfections, scratches, and dents on a vehicle surface. FIGS. 2A and 2B illustrate an existing studio configuration 10 for generating a contrast break line 12 on a vehicle with additive lighting. The bottom edge 16 of a light box 14 creates the break line 12 between highlight and shadow. FIGS. 3A and 3B illustrate an existing studio configuration 20 for generating a contrast break line 12 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales. Thus, there is a need to be able to rapidly produce high quality reflection free images of vehicles from multiple angles and perspectives.

SUMMARY OF THE INVENTION

Various embodiments can comprise a photographic chamber. The photographic chamber can comprise one or more curved frames arranged in a convex shape, one or more cameras coupled to the one or more curved frames, one or more lighting elements, one or more walls arranged on a floor of the photographic chamber creating a contrast break line, and a door comprising at least one of the one or more walls or the one or more curved frames. In many embodiments, the one or more cameras can be configured for photographing a vehicle in the photographic chamber. In some embodiments, the one or more lighting elements can be configured to cast bounce lighting onto a surface of the vehicle.

Many embodiments can comprise a method for using a photographic chamber. The method can comprise moving a vehicle into the photographic chamber moving a door into a closed position, generating a contrast break line, and capturing one or more photographs of a vehicle. The photographic chamber can comprise one or more curved frames arranged in a convex shape, one or more cameras coupled to the one or more curved frames, one or more lighting elements configured to cast bounce lighting onto a surface of the vehicle, one or more walls arranged on a floor of the photographic chamber creating the contrast break line, and a door comprising at least one of the one or more walls or the one or more curved frames.

Further embodiments can comprise a method of constructing a photographic chamber. The method can comprise arranging one or more curved frames in a convex shape, coupling one or more cameras to the one or more curved frames, illuminating one or more lighting elements, arranging one or more walls on a floor of the photographic chamber, and providing a door comprising at least one of the one or more walls or the one or more curved frames. The one or more cameras can be configured for photographing a vehicle in the photographic chamber. The one or more lights can be configured to cast bounce lighting onto a surface of the vehicle. The one or more walls can create a contrast break line.

A circular dome for photographing vehicles includes curved frames that support a skin. Contoured walls offset from the curved frames to define a recess adapted to receive cameras and lights for photographing vehicles around a perimeter of the dome. A door matching the contour of the curved frames completes the dome and is size to receive a vehicle, to collectively implement subtractive lighting along the perimeter of the dome.

A system is provided for photographing vehicles. The system includes the dome with cameras mounted within the walls for recording images of a vehicle that are uploaded to a database, with at least one camera, video system, or computing system used to generate image data from the vehicle positioned in the structure. The system further includes a lighting system, a tracking system to actuate one or more of the plurality of cameras and lights in a predetermined sequence and combination based on the position of the vehicle within the circular domed structure.

A process is provided for photographing a vehicle. The process includes driving the vehicle into a circular domed structure and closing a door with the vehicle in the dome. The vehicle is selectively illuminated by a first subset of lights arrayed in the structure, and a first photograph is collected from a plurality of photographs of the vehicle with illumination from the first subset of lights. Subsequently, a second subset of lights arrayed in the structure are selectively illuminated, and a second photograph is collected from the plurality of photographs of the vehicle with illumination from the second subset of lights.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
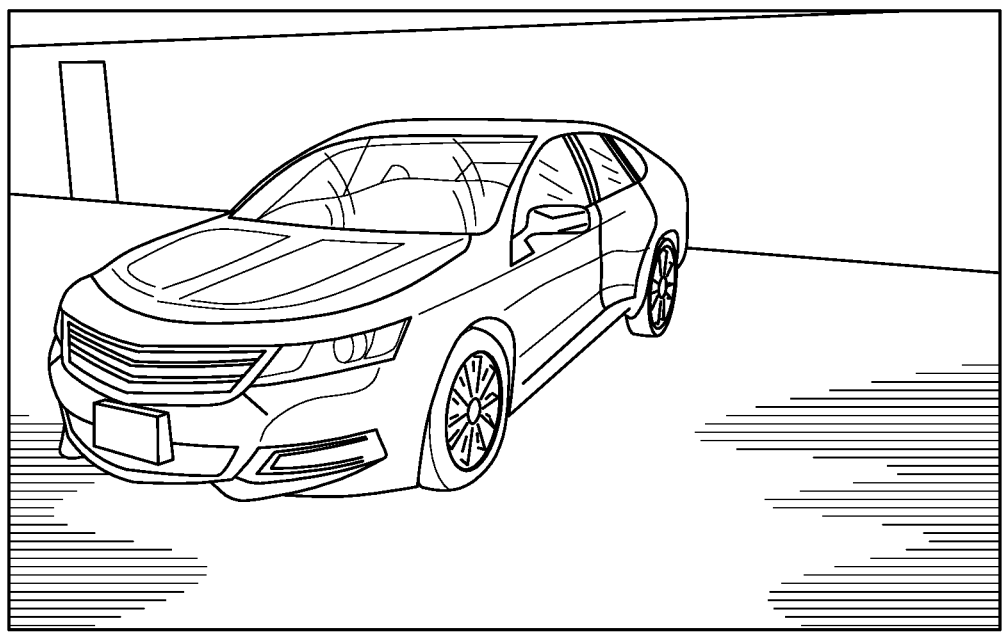
FIGS. 1A and 1B are typical non-studio quality vehicle photographs.
Figure 1B:
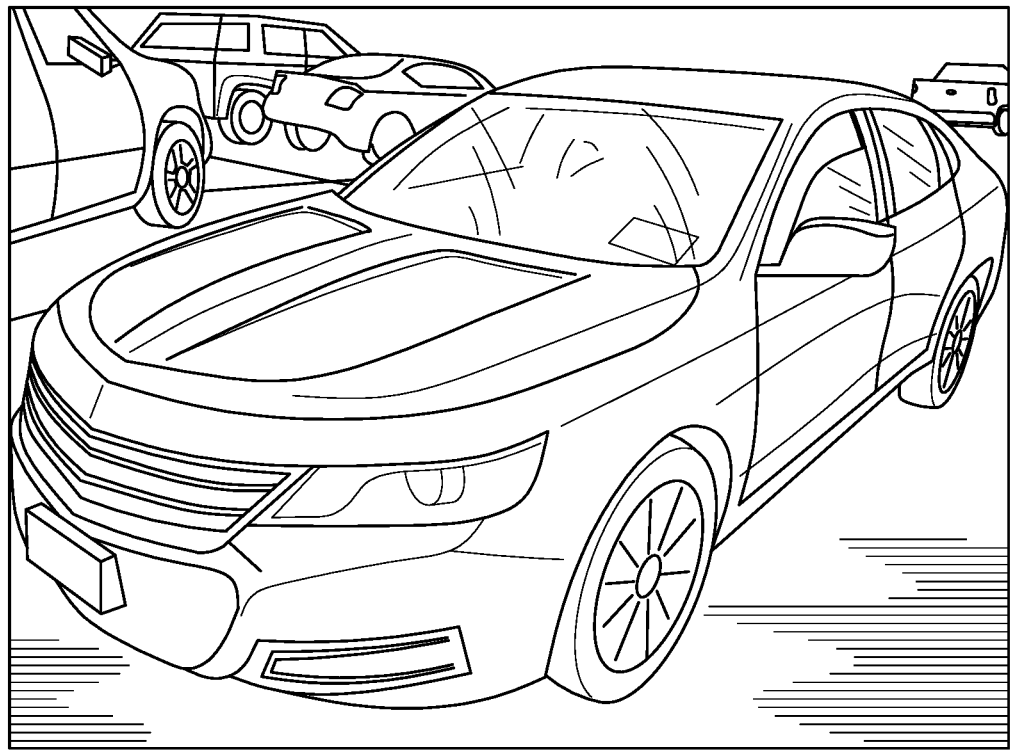
Figure 2A:
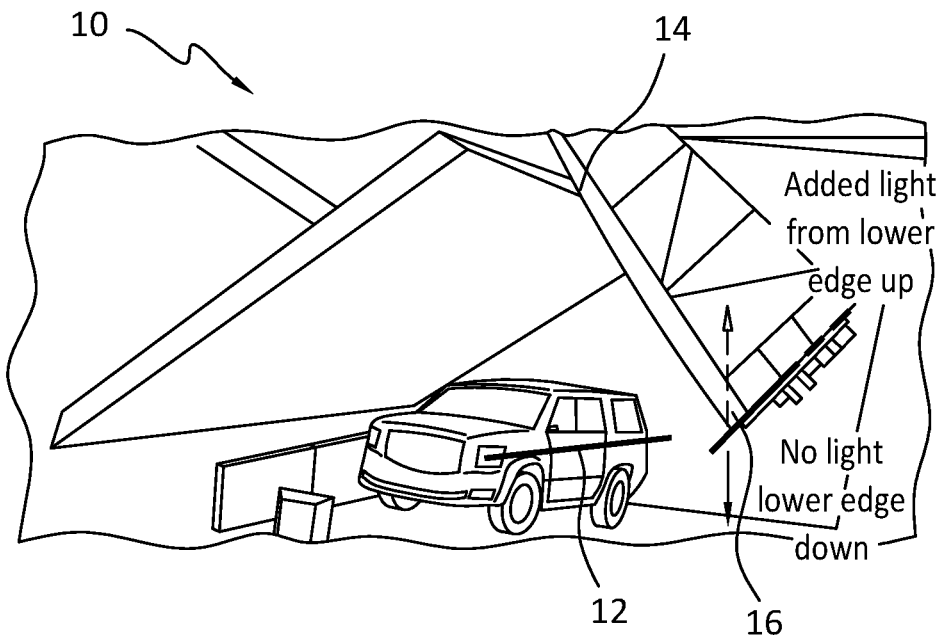
FIGS. 2A and 2B illustrate an existing studio configuration for generating a contrast break line on a vehicle with additive lighting.
Figure 2B:
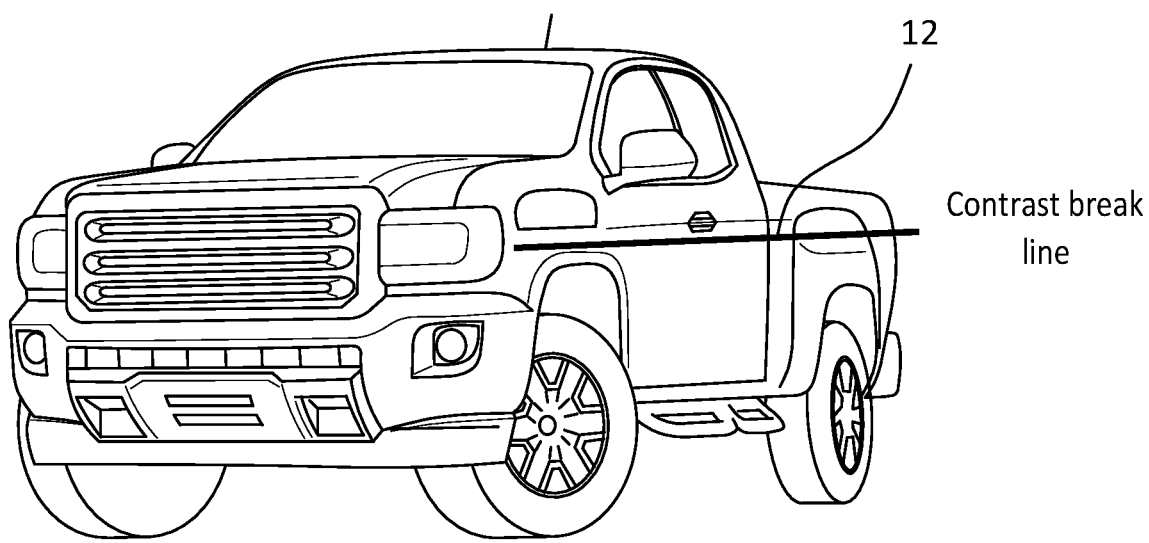

A number of embodiments can include a photographic chamber. In some embodiments, a photographic chamber can comprise one or more frames arranged in a convex shape and having an opening; one or more walls coupled to the one or more frames and having one or more recesses configured to receive photography equipment; and a door matching the one or more walls, wherein the door can be located in the opening when positioned in a closed configuration.

Various embodiments include a method. In some embodiments, a method can comprise providing one or more frames arranged in a convex shape and having an opening; providing one or more walls coupled to the one or more frames and having one or more recesses configured to receive photography equipment; and providing a door matching the one or more walls, wherein the door can be located in the opening when positioned in a closed configuration.

The present invention has utility as a system for automatically photographing vehicles in an enclosable circular domed structure where an automated process captures a series of vehicle images and uploads the captured images to a web template for display and recordation. In some inventive embodiments, a system is based on zoomable high resolution images, IPAD®, or IPHONE®, or similar device that loads pictures directly to the web site. The images captured have controlled reflections from multiple angles and perspectives. The room shape is chosen such that using a second set of lighting pointed up reflects that light though the open doors and windows allowing for an exterior booth to produce well-lit interior photos. In a specific inventive embodiment, a slightly flattened dome shape allows a second set of lighting to be used that is directed upward towards the ceiling curve and reflected back down through the open doors and windows of a subject vehicle, and this generates well-lit interior photos. A viewer is able to discern whether there are surface imperfections, scratches, and dents on a vehicle surface. Reflections are controlled in the circular domed chamber with curved walls and a matching contoured door that are covered with a light scattering sheet material such as a white canvas or gray walls. In specific embodiments of the inventive image capture system, the lighting style used to illuminate the vehicle within the enclosed circular chamber configuration is a sunset horizon style of lighting, where the lights are hidden below the curved wall that may be gray or white so as to use a sunset style reflection on the vehicle surface through subtractive lighting. A sunset style reflection refers to a hot horizon line on the vehicle with a rapid fall off (i.e., a sunset shot). In some inventive embodiments, light reflection from the sheet metal is hidden in the resulting images through lighting control. For example, in a specific embodiment the lighting around the dome is controlled in such a way to maintain a consistent value of the vehicle's reflection. During the rotation, as the sheet metal becomes more efficient, relative to the camera position, the lighting is adjusted to compensate. It is appreciated that the light is much stronger at the profile view while it tapers off as it approaches a ¾ or ⅞ view. At these angles the rear lighting in the booth must be dimmer to appear consistent throughout.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the inventive enclosable circular domed photographic booth provide a photography stage with horizontal lighting that may be configured as subtractive lighting that utilizes a series of cameras and/or camera groups and associated lighting elements for multi-camera sequenced photographs of a vehicle from various angles when the vehicle is positioned on the stage. In a specific inventive embodiment, the vehicle is positioned on a stationary photographic stage and a series of cameras positioned around the perimeter and above the vehicle capture vehicle images in the enclosable domed photographic booth. Alternatively, in an inventive embodiment the photographic stage in the enclosable domed structure may rotate the vehicle past a bank of cameras. The use of sequenced and automated image capture allows for the rapid image processing of vehicles for auction sales, dealer records, as well as car condition assessments for rental agencies, fleet management companies, public safety agencies, municipal and government agencies, etc. A complete set of vehicle images are collected in between 5 and 90 seconds allowing for high throughput imaging associated with an auto auction or manufacturer. Additionally, in certain inventive embodiments, at least one camera is placed behind a shutter. In still other embodiments, the shutter is color and texture matched such that the shutter when closed visual fades into the background. Cameras are placed behind a shutter to hide their reflection when a camera is not currently the active camera. In still other embodiments, the photographs are manually retouched or retouched by a program to minimize background defects. In still other embodiments, an alphanumeric code, illustratively including the vehicle identification number (VIN), automatic or manual bar code reading, or radiofrequency code associated with a vehicle is read automatically and associated with the resulting photographs.

Embodiments of the inventive enclosable circular domed photographic booth allow for a complete set of multi perspective high quality vehicle images to be obtained and recorded into a template or placed in a shared network folder in less than 90 seconds, and in some instances in approximately 5, 10, or 15 seconds. Thus, once a subject vehicle is photographed in the inventive enclosable circular domed photographic booth, the vehicle is available and ready for sale online based on the uploaded images and VIN uploaded information. The rapid processing time of the inventive enclosable circular domed photographic booth provides images that are equivalent to existing professional photographic staging methods that take several minutes to several hours to obtain a set of vehicle images. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive enclosable domed photographic booth may utilize radio frequency identification (RFID) tags to identify and record vehicles as the vehicles are processed through the system. The RFID may be related to the vehicle identification number (VIN) of a vehicle to be processed. It is further appreciated that additional identifiers may be used illustratively including barcodes that relate to the VIN. Information related to the vehicle, such as vehicle make, model, body style, and color encoded in the VIN may be used to automatically adjust lighting, the height and/or angle of the gray wall to optimize photographic conditions, as well as camera height, zoom, and camera placement/position for a subject vehicle to be processed. Through control of lighting and camera firing sequence, the driver of a vehicle is virtually invisible as a result of being hidden by glass reflection. Further information that may be related to the RFID or barcode may include a dealership setting that may also indicate which dealer the vehicle is being shot for and incorporate that dealer's specific preferences such as lighting style, file size and format, number of photo shots and angles to be recorded. RFID or bar code information, read manually or automatically may also be used to project text onto the background of the shot or overlay text onto the file during processing, such as price, dealer name, vehicle specifications, mileage, etc. In a manual "Walk Around" booth embodiment, knowing the make and model number or client in the case of a shared booth could automatically tell the photographer where to stand and what pictures to take. Embedded LED lights in the walls and floor of the booth, or a single overhead theater tracking light may direct the photographer where to stand to take a picture. As a result of preset angles and lighting, high quality images are collected in a fraction of time compared to an individual vehicle photo-session. In some inventive embodiments, each photograph triggers the next lighting and photographer position. The number of shots and positions in some inventive embodiments are determined by the RFID or barcode and data base information. Utilizing the optical tracker of embodiments of the invention, the program of where and how to shoot can be obtained by watching and recording a "real professional" photographer shoot a vehicle of similar body style. This recording would include all lighting positions and settings, camera and lens metadata as well as height and distance. This information would be stored in a reference bank and used to automatically recall and reconfigure the room for each new shot. In some embodiments the non-tech operator's images are automatically compared to the professional photographer's images and accepted or rejected based on certain matching criteria.

Figure 7:
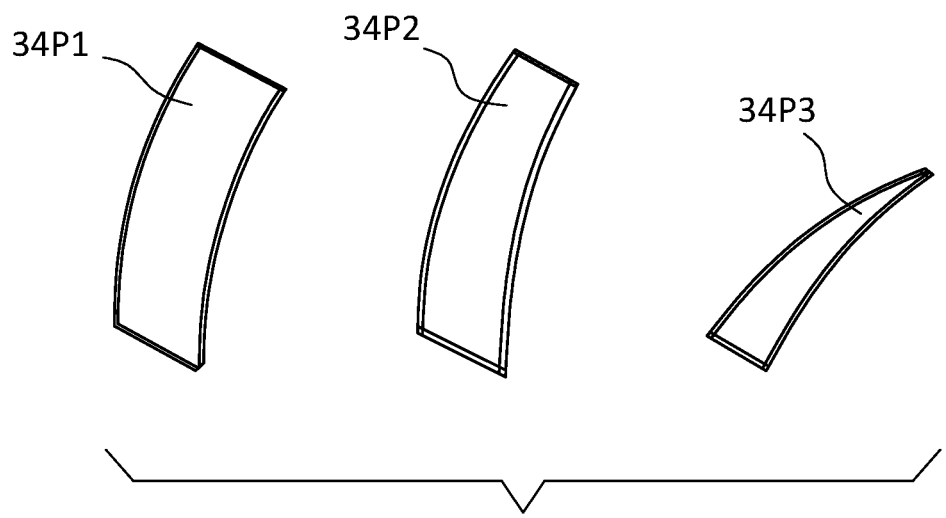
FIG. 7 illustrates modular panels for the dome walls in accordance with an embodiment of the invention.

Referring now to the figures, an embodiment of the enclosable circular dome photographic booth is shown generally at 30 in FIGS. 4A-4E. The booth 30 is constructed with a frame 32 with a canvas 34 attached to the frame to form a dome shaped roof 36. In a specific embodiment, a set of thermoformed panels 34P1-34P3 as shown in FIG. 7 may be attached to the frame 32 to form the inner walls and photographic background of the dome 30. The dome shaped roof 36 and a matching contoured swing door 38 both have a straight, sloped, or angled horizon wall 54 and horizon lighting that in the present invention precludes secondary reflections that negatively affect image quality. The contoured swing door 38 with the horizon wall 54 and horizon lighting creates a uniform background in front corner camera shots having the entrance 44 in the background thereof. In a specific embodiment swing door 38 may have a hinged connection 40 to frame 32. An RFID reader, alphanumeric reader, or automatic bar code reader 42 may be mounted at or above the entrance 44 to read the identification tag associated with a subject vehicle. The driver of the vehicle in some embodiments may have an RFID name tag to track who shot the images or to monitor productivity. Also mounted at the entrance 44 may be a series of driver feedback lights 46 such as red and green lights. In a specific embodiment, a blue light indicates that the booth is ready for a vehicle to accept a vehicle. A green light indicates a successful RFID or barcode read and drive through. In the event of a bad RFID or barcode read and the indicator light goes red. Pressure sensor strip 48 activates the system when the vehicle tire runs over the sensor strip 48. Painted guide strips 50 provide a visual path for the driver to proceed into the booth 30 and onto the stage or platform 52. In a specific embodiment the platform 52 is stationary with a series of cameras 62 positioned about the perimeter and top of the enclosable circular dome photographic booth 30 as shown in the cross-sectional view of FIG. 5A. Alternatively, in an embodiment of the inventive booth 30 the platform 52 rotates the vehicle relative to single bank of cameras.

Embodiments of the circular domed photographic booth 30 are energy efficient. In terms of power distribution, a similar system should draw 200 to 400 amps, however less than 80 amps are typically drawn in operation of embodiments of the invention. Specially sequenced relays bring each of the power zones up one at a time thereby stopping high in rush current. A number of power zones ranges from 1 to 20. The lighting system, to be described in greater detail below, typically has between 20 and 100 strobes, while in specific embodiments, between 40 and 80 strobes. These strobes operate at 2-10 amps are load balanced so that when each zone fires only a fraction of the power load is needed. The system boots up in a fixed sequence for reliability as follows: computer, universal serial bus (USB) extension power, and camera power up one at a time, shoot all cameras in defined sequence, check to see if all image files exist (nine files in the present embodiment), if yes—run remaining boot up script—if not, restart.

In other inventive embodiments, another script is run, triggering each camera in series and each light individually or in groups. These images are automatically analyzed to determine if any of the lighting equipment is not firing. If a group of lights from a specific camera view is read as darker than it should be then each light is in turn fired and each new photograph examined to narrow down and pinpoint which lighting fixture is not working. The system then emails a supervisor with a report of the booths condition, actuation counts and percentage of expected camera and strobe life left. Included in the report are recommendations of repairs or maintenance needed as determined by analyzing the various booth data.

Figure 4A:
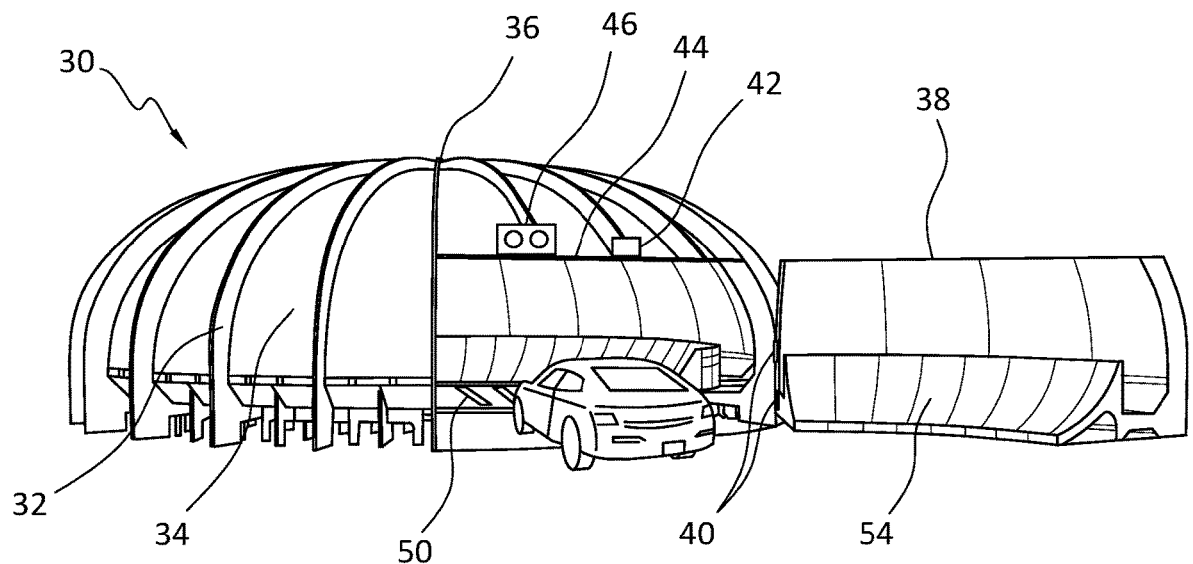
FIGS. 4A-4E are a series of views of an enclosable domed photographic booth in accordance with an embodiment of the invention.
Figure 4B:
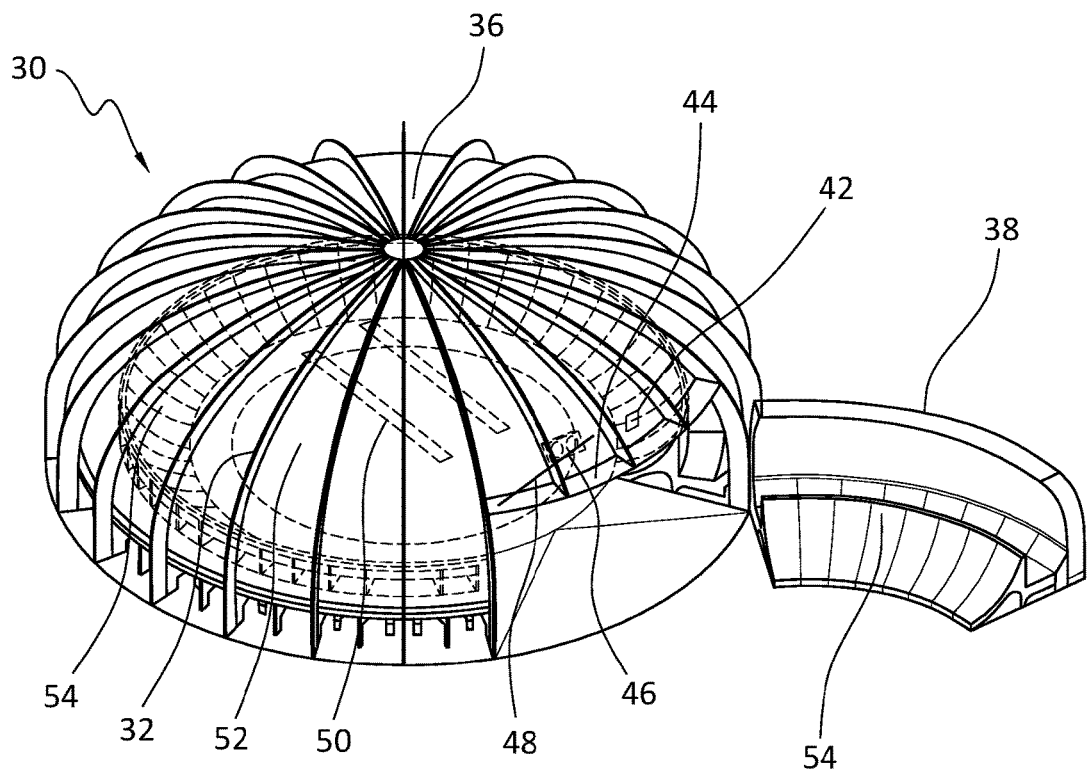
Figure 4C:
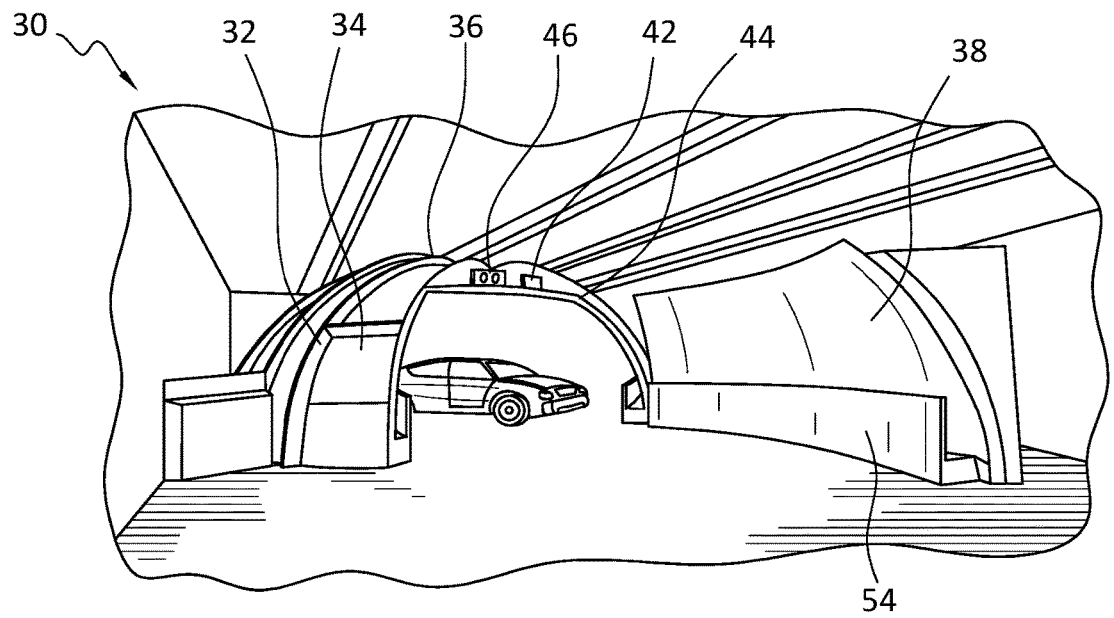
Figure 4D:
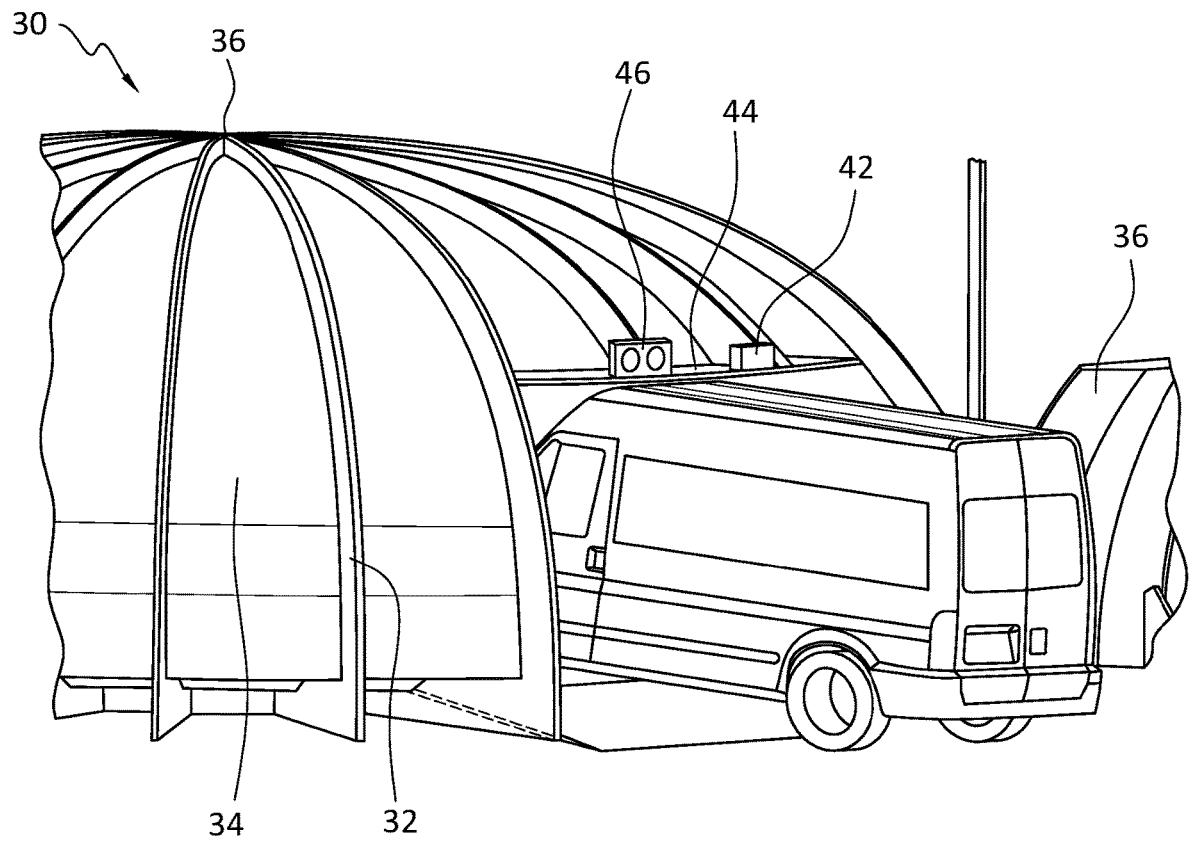
Figure 4E:
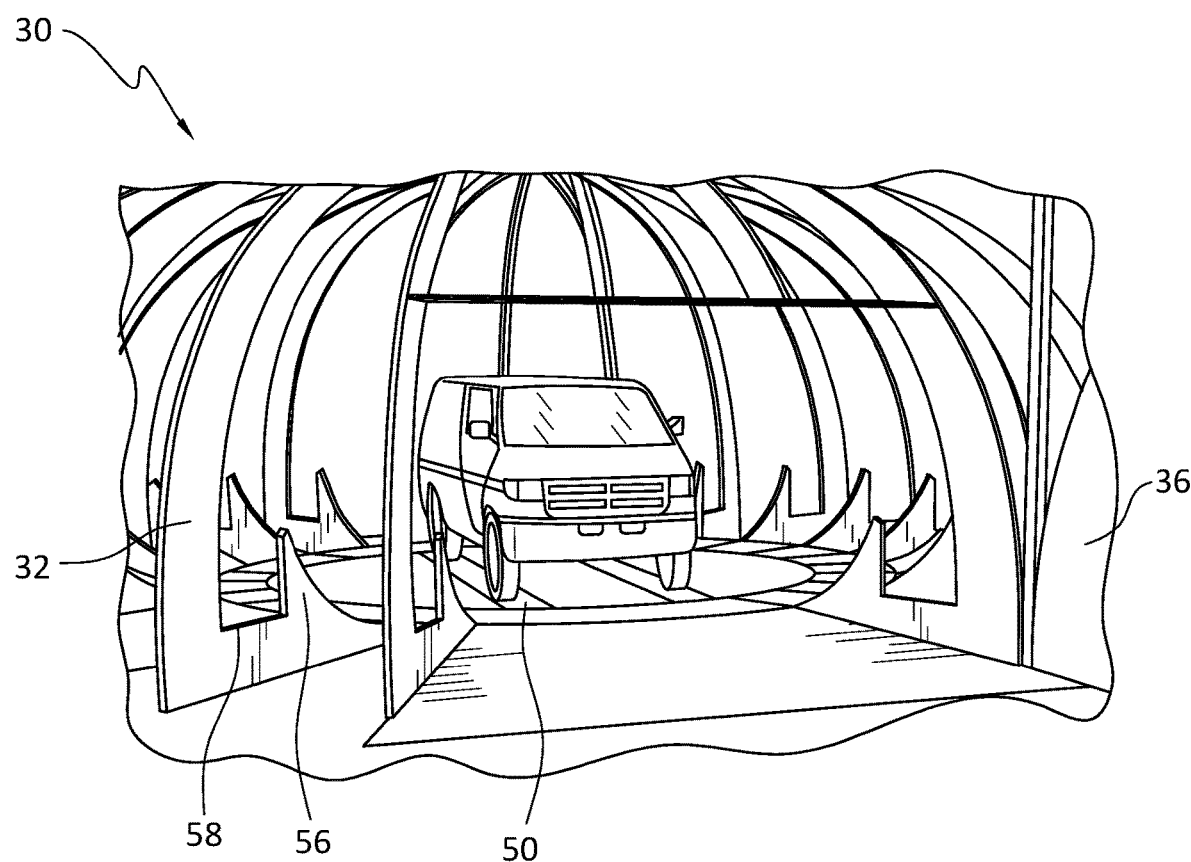
Figure 8:
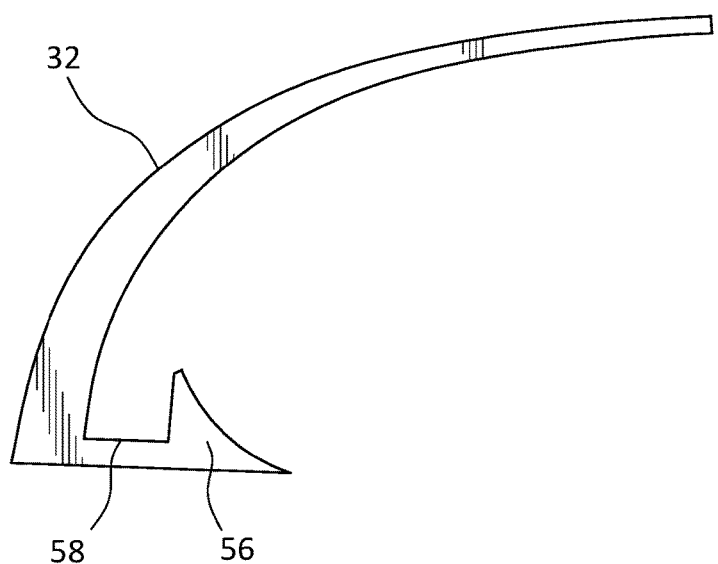
FIG. 8 is a photograph of vertical frame members that are shown as a single piece with a lower section that includes a contoured support for the sloped or angled horizon wall in accordance with embodiments of the invention.
Figure 9:
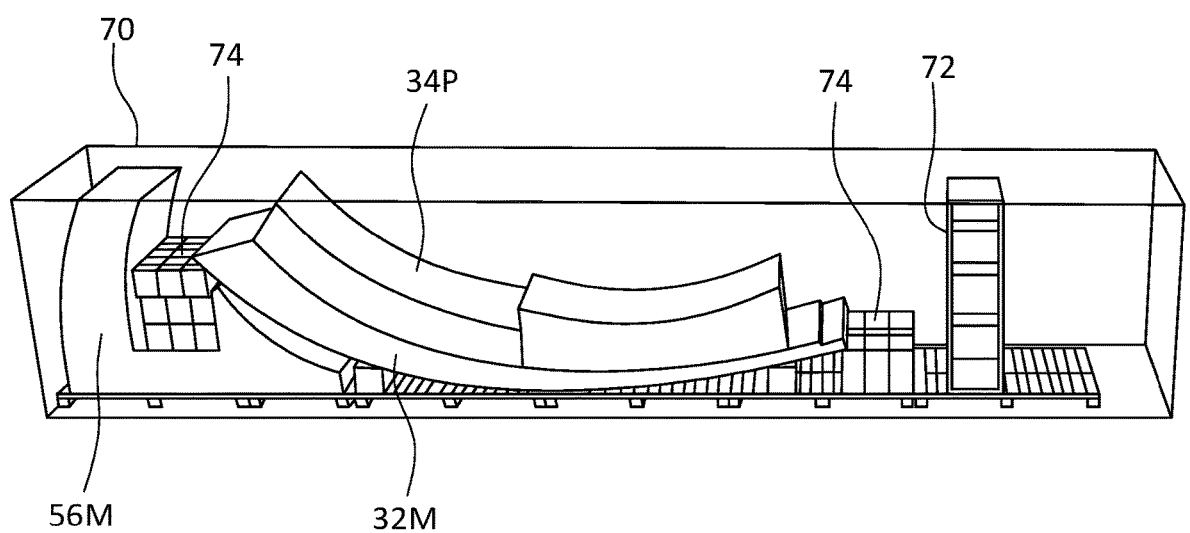
FIG. 9 shows a transportable container storing the pieces and components to build an embodiment of the domed photographic booth.

FIGS. 4B and 4E are computer aided design drawings of the frame structure 32 that form the domed photographic booth 30. As shown in FIG. 4E and in FIG. 8 each of the vertical frame members 32 are shown as a single piece with a lower section that includes a contoured support 56 for the sloped or angled horizon wall 54 and a well area cutout 58 for placement of the horizon lighting fixtures. The frame 32 may be precision cut (CNC) and pre-drilled to allow for a simplified and precise installation. The frame 32 may be made of wood, composites, aluminum, etc. In an embodiment (not shown) the structure may be made of prefabricated pieces of fiberglass or Styrofoam blocks, such as are made for ray domes or radial antenna domes, or inflatable dome structures. The heavy canvas or fiberglass composite skin 34 eliminates the need for drywall and sanding at the drywall seams. In an embodiment the skin 34 may be stapled to the frame 32, with the staples covered by a painted patch to hide the staples and the seam. The dome structure photographic booth 30 is amenable to being disassembled and moved as required. FIG. 9 shows a transportable container 70 storing the pieces and components to build an embodiment of the domed photo graphic booth. As shown in FIG. 9 the modular frame 32M and contoured support 56M components are grouped together along with boxes 74 that may contain lighting, cameras, and other electrical components, as well as a computer/controller 72 that are all placed in the container 70.

Figure 3A:
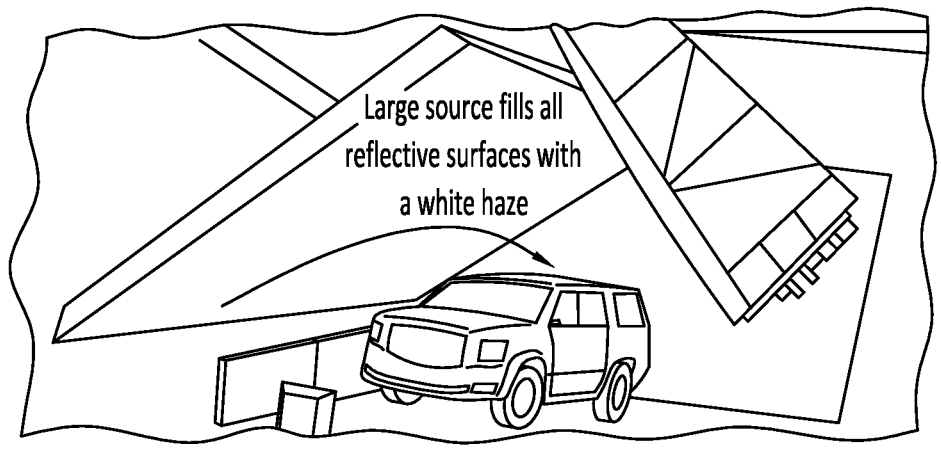
FIGS. 3A and 3B illustrate an existing studio configuration for generating a contrast break line on a vehicle with subtractive lighting.
Figure 3B:
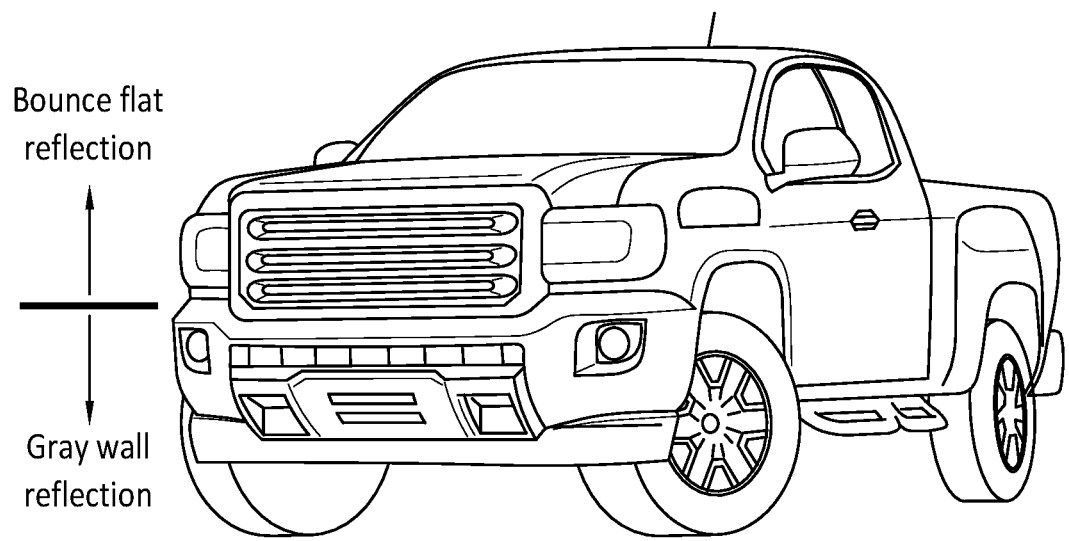
Figure 5A:
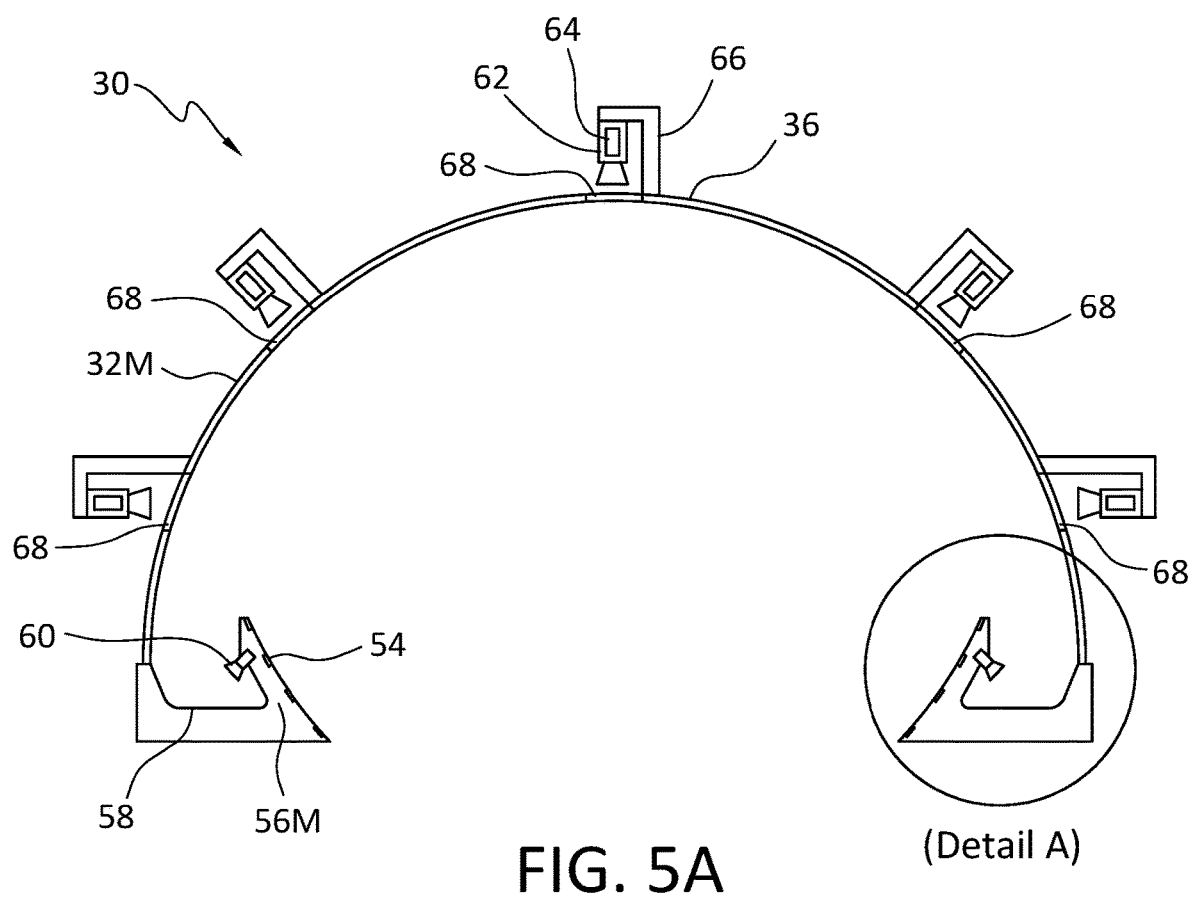
FIG. 5A is a cross-sectional view of the domed photographic booth showing the placement of the lighting fixtures in the horizon wall and strobe lighting and cameras in the dome walls behind retractable shutters in accordance with an embodiment of the invention.
Figure 5B:
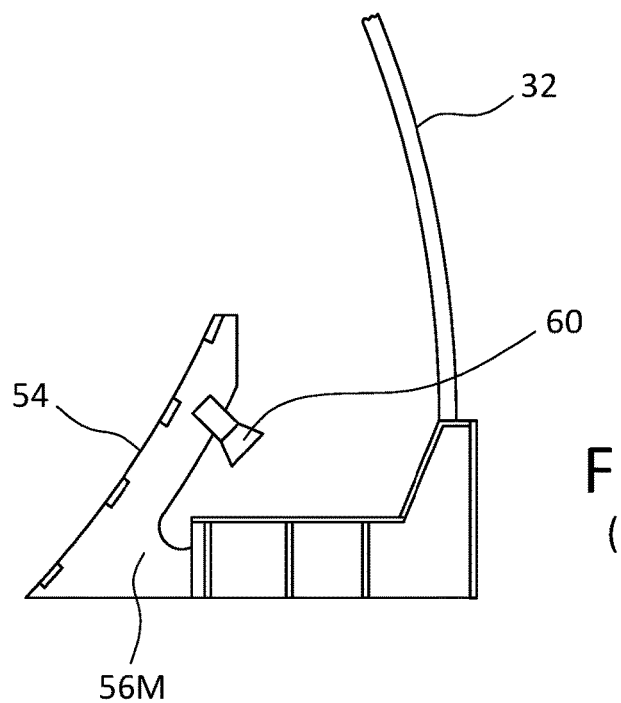
FIG. 5B is a detail view of the horizon wall of FIG. 5A.
Figure 11:
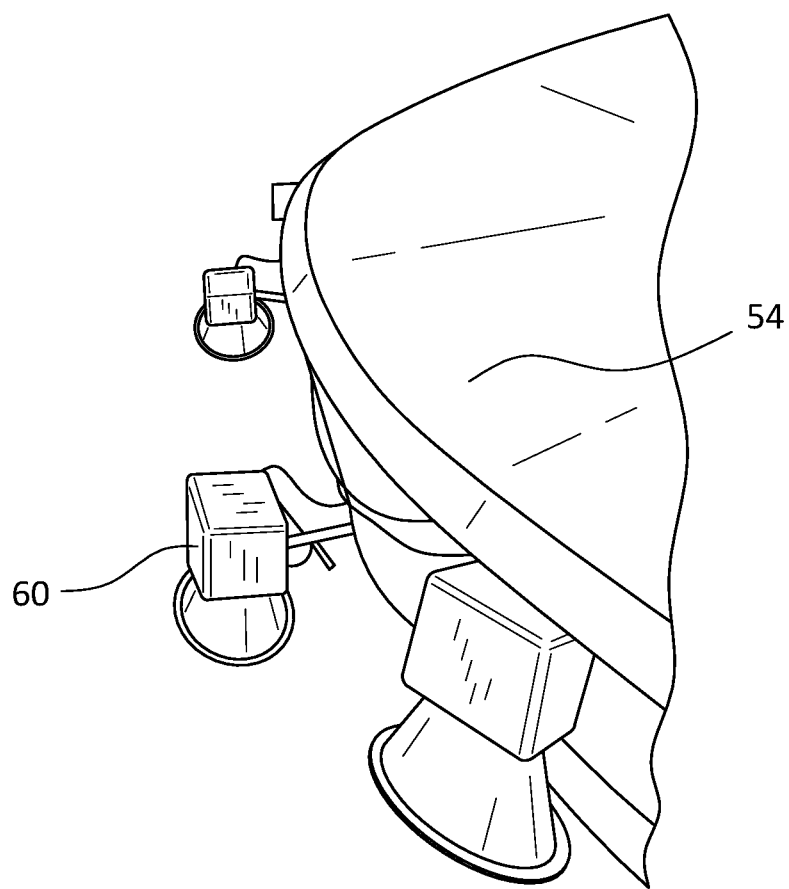
FIG. 11 is a photograph of the strobe lighting system positioned behind a section of the subtractive gray wall according to an embodiment of the invention.

As shown in FIGS. 5A, 5B, and FIG. 11 embodiments of the inventive enclosable dome photographic structure 30 employ hidden lighting elements 60 behind a horizon wall or hip wall in the form of a gray wall 54 to create a contrast break on the side of the vehicle with subtractive lighting. The subtractive lighting method produces a booth with all bounce lighting and 100% controlled reflections on the vehicle surfaces. No reflections of the light sources or of the lighting fixtures themselves show up in the vehicle surface paint. Embodiments of the structure booth form a large smooth white room, and then subtracting that white from the reflections using the gray wall for contrast break in reflection. A totally white room would make a subject vehicle look flat and dull with no contrast, and there would be no accent of the vehicles natural body lines. The inventive enclosable dome structure employs an innovative continuous 360 degree gray wall or partial 360, or straight sections creating the same contrast break or hiding direct reflections of the lighting as shown in FIGS. 4A-4C with the swing door 38 closed, to produce a clean horizon line in the vehicle's reflections at all angles about the perimeter of the vehicle. The shape of the structure booth 30 wraps light around the front and rear of the vehicle while also wrapping the horizon reflection around the vehicle, which allows the vehicle to be photographed from multiple angles and still have the same high end look without the need to adjust the lighting or gray wall for each shot for a given subject vehicle. A clean top edge of the horizon wall causes a crisp reflection in the vehicle and is the break point between highlight and shadow. The use of a 360 degree gray wall differs from a typical professional studio (see FIG. 3A) where the "gray wall" is usually a strip of cloth hung on a pole and positioned between the car and the light source, and is only used on one side of the car being shot at that time and would be positioned based on what works for a single camera angle. The gray wall used in embodiments of the invention is unique in the fact that the gray wall is a fixed hard structure that is optimized to give the desired reflection on a full range of vehicle shapes and sizes from multiple camera angles. Thus, while the viewing angle may change, the lighting style remains consistent across all viewpoints. The gray wall may be built from materials such as wood, composites, metals, etc., and may be in a fixed position or may be repositionable.

As shown in FIG. 5A cameras 62 and lighting elements 64 are deployed around the parameter walls (34, 32M) and ceiling 36 of domed photographic booth, square, or oval 30. The cameras 62 and lighting elements 64 are secured by brackets 66 to the frame (32, 32M). The cameras 62 and lighting elements are concealed behind shutters 68. The positioning of the cameras provides varying perspectives of the vehicle being photographed when the vehicle is stationary and not on a rotating platform.

Figure 6:
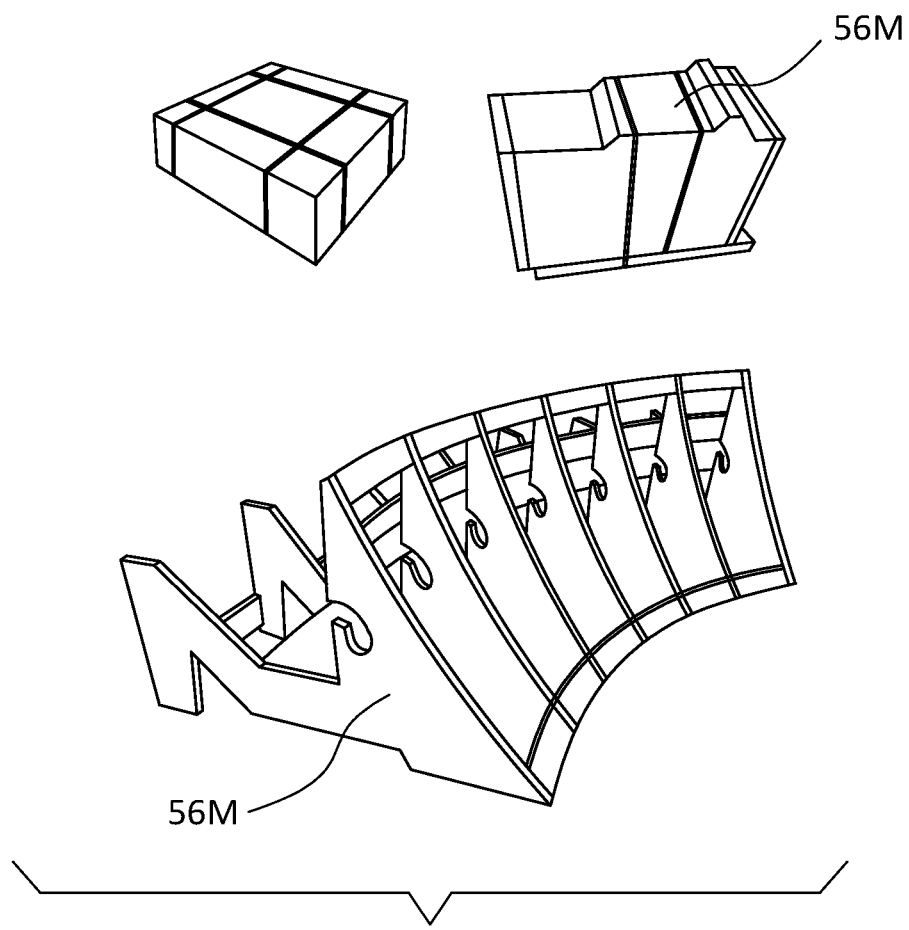
FIG. 6 is a photograph showing a modular construction of the horizon wall frame that is stackable when stored in accordance with an embodiment of the invention.

FIG. 6 illustrates the construction of an embodiment of a modular gray wall frame 56M that is stackable for storage and for transport. In a specific embodiment the horizon gray wall may be automatically or manually moved. For example, after reading the RFID or barcode tag of a vehicle, the booth knows the make and model of the vehicle that is in the booth. The horizon gray wall may be automatically adjusted in height and angle to put the perfect body line reflection into any subject vehicle. Furthermore, the gray wall can also take into account that manufactures or retailers' preferences as to how they prefer the body styling and lighting style to interact.

Figure 10A:
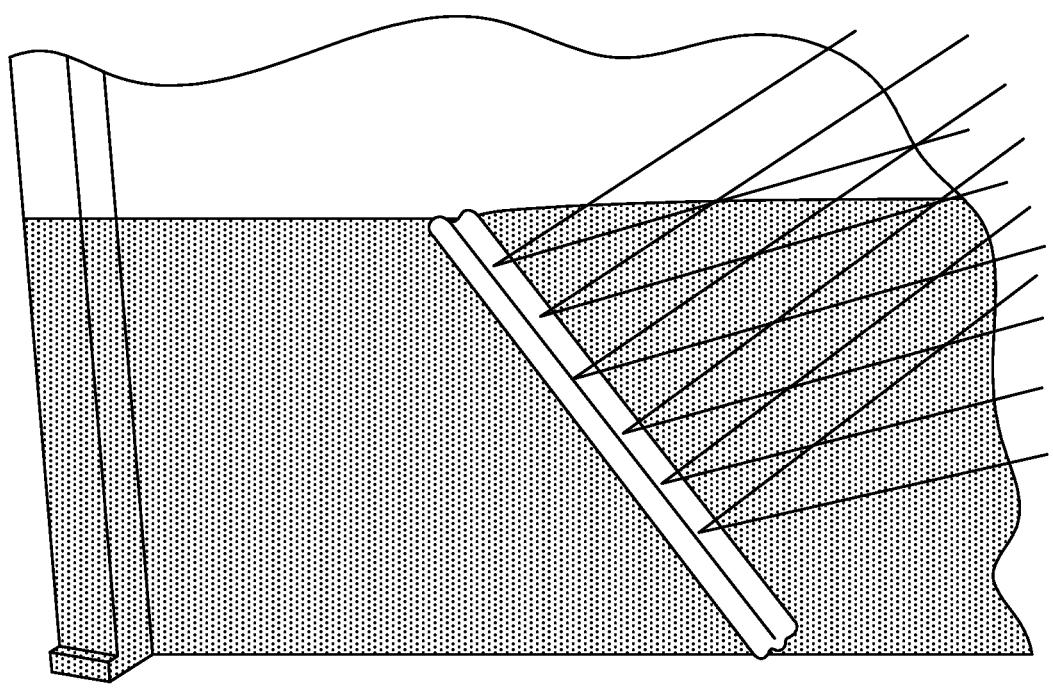
FIGS. 10A and 10B illustrate the difference in light reflection between a straight and curved subtractive gray wall, respectively according to an embodiments of the invention.
Figure 10B:
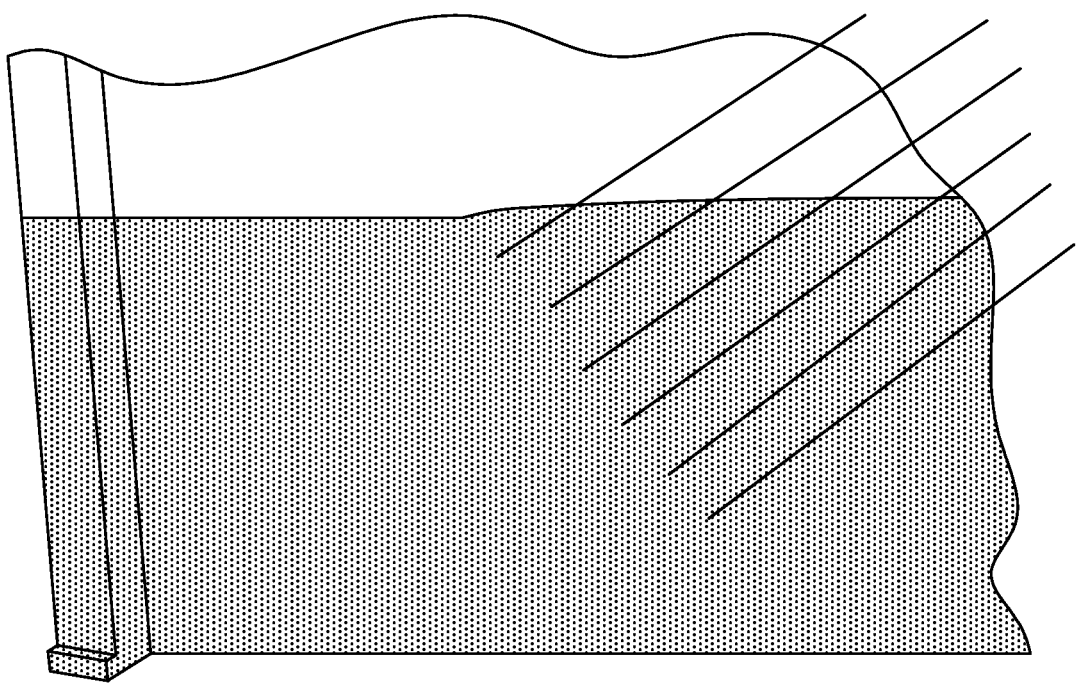

Embodiments of the inventive enclosable dome photographic booth may use a curved horizon wall that both has a curved face surface and also curves around the front and back of the vehicle. As best seen in FIGS. 10A and 10B, the angle of the horizon wall provides bounce lighting that provides fill for the lower part of the vehicle. It is appreciated that a straight hip wall, a slant wall, or a radius wall are all operative herein. While it would be much easier to build the horizon wall as a simple vertical wall or as a slanted wall, the use of a curved face affords the lower part of the car some bounce fill light while not allowing the light to produce surface sheen on the wall and back to any of the cameras. If the wall were merely a slant board (FIG. 10A) some camera angles would pick-up glare that would also show up as undesired reflections in some of the vehicle's surfaces. As shown in FIG. 10B, as light bounces off the curved gray wall surface the light is redirected at many angles and thus never builds up into a sheen, and still provides bounce light for the lower area of the vehicle. The radius of curvature of the gray wall panels may be adjusted depending on the desired lighting effect. In embodiments of the inventive drive-thru structure booth, the wall is also painted so that the wall matches the floor color and tone as seen by the cameras. The blending of the wall with the floor is evident in FIGS. 10A and 10B at the interface between the horizon walls and the floor of the dome booth. Because the horizon wall is on a different plane and has a curved surface, the wall actually needs to be painted one tone lighter than the floor to appear as the same tone to the cameras. The horizon wall structure is also used as a place to mount and conceal the lighting, as best seen in FIG. 11, as well the cross-sectional drawings of FIGS. 5A and 5B. From the lighting mounted position, the lights brighten the upper portion of the dome with soft light and brightly lights the portion of the wall right above its top edge of the gray wall creating the distinctive sunset like reflection in the vehicles paint. By creating an empty space or white bounce box between the back of the gray wall and the dome wall the strobe heads can be pointed downward so the light bounces off the floor and then up the wall, which significantly makes the beam of the light wider and gives a softer quality of light, while also dramatically cutting down on the amount of space needed between the gray wall and the structure wall. In a specific embodiment, the top of the gray wall is just 20" away from the structure wall. It is noted that the versatile 360 degree horizon wall concept will work equally well in still photography, video or three-dimensional (3D) rendering.

It is appreciated that computer-generated imagery (CGI) vehicle rendering is also accomplished with lighting angles of the present invention. If all the measurements are the same and the lighting values are the same then the virtual vehicle would look pretty much the same as a real vehicle in that environment. Even easier would be to shoot a high-dynamic-range imaging (HDRI) lighting map from the center of an inventive rotary stage. In simplest terms, a HDRI lighting dome is a sphere where the inside has a 360 panoramic image projected upon it and thought of as huge stained glass dome where the glass looks exactly like the room as viewed from the center of the room and, has an infinite amount of light being projected through it. When a reflective 3D object like a car is placed in that virtual environment, then the reflective 3D object will reflect the lighting setup exactly as it would in real life. In this example a series of photographs simulate a virtual room space.

In embodiments of the domed photographic booth, the lighting may be setup in zones that relate to each camera position. In a specific embodiment, there are 10 to 30 strobe heads, and in some embodiments between 16 and 52 strobe heads (base lighting) that fire for every triggering position as various perspective photographs of the vehicle are taken. The base lighting is used to provide overall fill lighting in the booth, create the background tone, and to hide the canvas seams. Each camera position has its own dedicated strobe group. The strobe group, when added with the base group has been optimized to give the best lighting for that angle of view or zone. One of the key points of this zone system is that the subject vehicle may be brightened without brightening the background. That is to say if all strobes fired at the same time and at the same intensity then the only way to brighten the car would also brighten the background. An overly white background will produce haze or flare in the photographs. It should be noted that the base strobe heads are turned all the way down, and this is what allows the base strobes to recharge very quickly and be ready again when the next zone needs to fire. In a specific embodiment as described in U.S. Patent Publication 20160100087 (Apr. 7, 2016) herein included by reference in its entirety, the strobe lights may be color coded as black, yellow, and white. The white strobe lights always fire at a trigger point as noted above as the base strobe, and the black and yellow strobes are near the same location but are associated with different cameras, so these strobes have different angles and power settings.

When shooting interiors, the automated lighting in some inventive embodiments will turn up the intensity of lights or adjust the number of lights being used behind the photographer while turning down the ones lighting the background seen through the windows at that angle. Thus, making it possible to photograph a dark interior or trunk without getting background flare.

The twenty six base strobe lights fire every time any other zone is also fired for the corresponding camera shot. The nine camera positions are defined as follows: C1—driver side rear quarter (DRQ), C2—driver side profile (DSP), C3—driver side front quarter (DFQ), C4—driver front low (DFL), C5—passenger front quarter (PFQ), C6—passenger side profile (PSP), C7 passenger rear quarter (PRQ), C8—passenger rear high (PRH), and C9—vehicle top down (VTD). In a particular example, the "base" strobes fire when any of the six lighting zones fire. The base strobes provide the general ambient lighting and flood the seam locations help blow them out to white. Even more exactly these base lights are divided into two groups of heads next to each other. Each head is doing the same thing, but by alternating which one head fires with the next zone, the first head has time to recharge before the vehicle reaches the next alternating zone. By way of example:

Trigger point 1 fires:
Custom lighting zone 1 and base group A (drivers ¾) 0.03 second delay
Custom lighting zone 2 and base group B (Passenger rear ¾, Passenger rear high)
Trigger point 2 fires:
Custom lighting zone 3 and base group A (drivers' profile, top down)
0.03 second delay
Custom lighting zone 4 and base group B (Passenger profile)
Trigger point 3 fires:
Custom lighting zone 5 and base group A (drivers front ¾, Driver front low)
0.03 second delay
Custom lighting zone 6 and base group B (passenger front ¾)

The base strobe lights provide a base exposure for the room and define the base background tone. The base strobe lights are placed at each seam point in the canvas or any interior surface material so that the bright light helps wash out the seam and its reflection in the vehicle. The base lights are set to their lowest power setting so that they can fire and be ready to fire again in 0.08 of a second. At full power the base lights take ½ second to recharge and would not be ready for the next trigger point. Driving at faster speeds is possible but an entire second set of strobes would need to be added and have to fire in an alternating manner to be ready when the next camera calls for base light. At that time each camera group had its own totally unique and isolated lighting positions. This is always the best case as each camera angle or group can be lit best far that viewing position.

Figure 12:
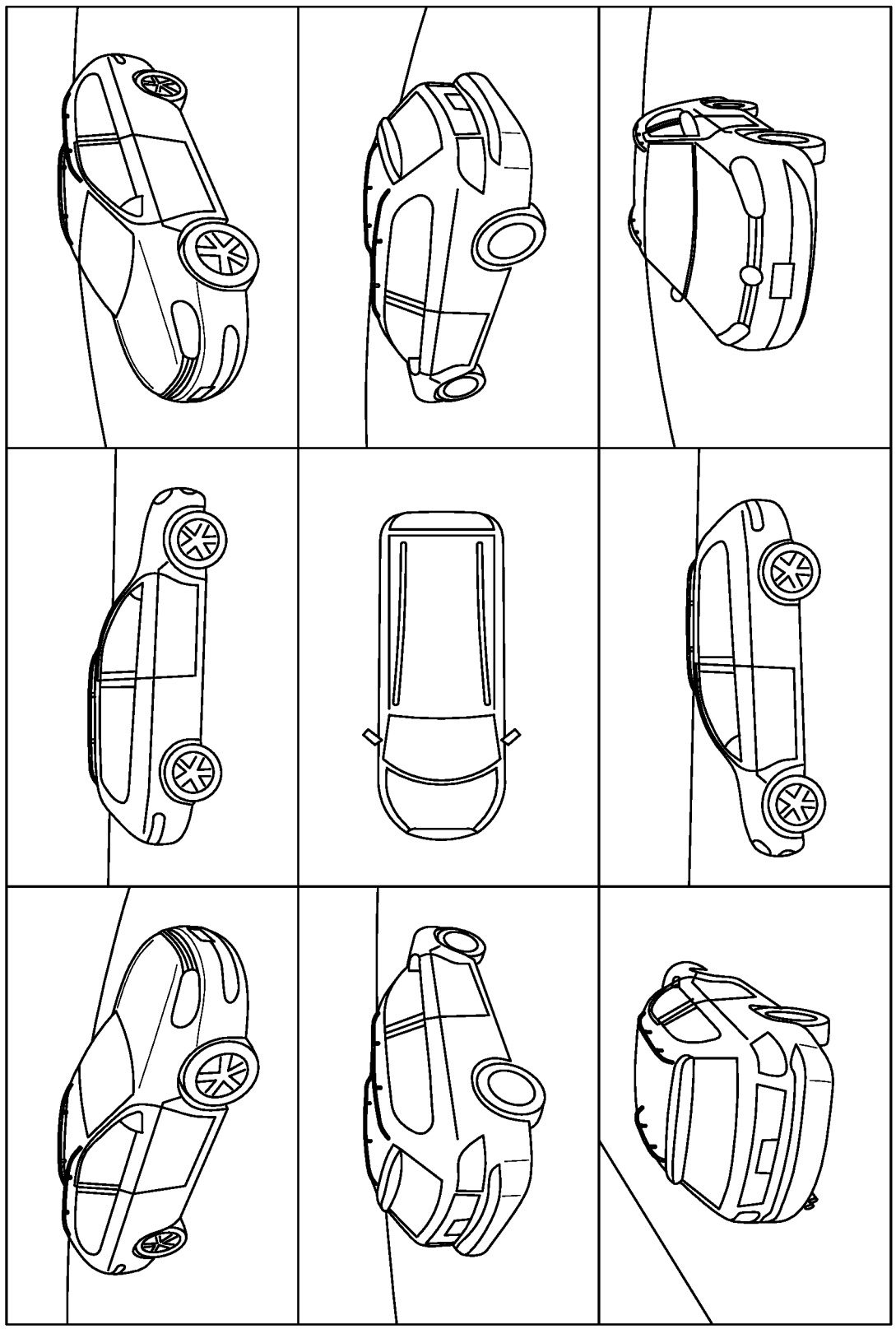
FIG. 12 is a series of high quality photographs obtained within the system according to embodiments of the invention.

FIG. 12 is a series of high quality photographs obtained within the system of the structure booth 30 according to embodiments of the invention. It is noted that to obtain this advertising quality look in a car photograph would normally take a professional photographer and two assistants the better part of a day to create these nine angles. The images as shown in FIG. 12 were captured and produced in 15 seconds with the horizon wall lighting technique that give the vehicle a sunset look that accents the body shape of the vehicle. It is also noted that although photographers may set up single angles in this style, embodiments of the inventive domed structure booth is the first to create the horizon look over 360 degrees of vehicle reflection.

Figure 13A:
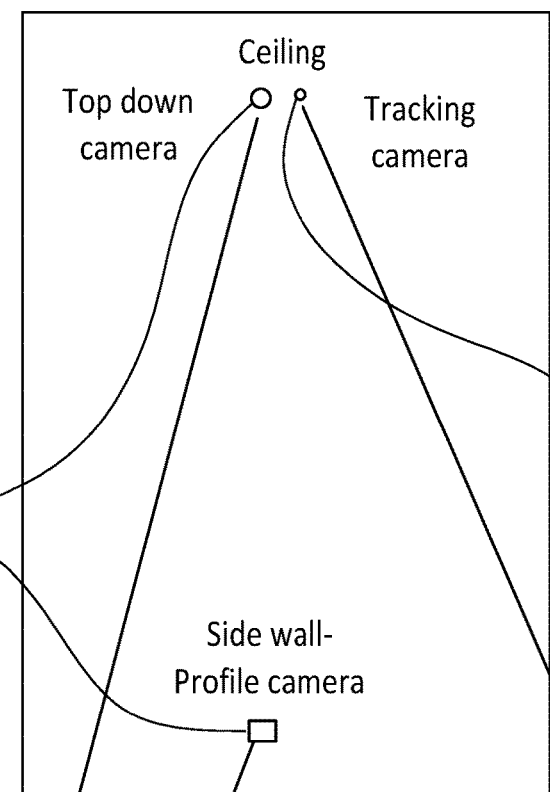
FIGS. 13A-13C are perspective views showing a portion of structure wall and ceiling showing the position of the image capture cameras and a tracking camera according to an embodiment of the invention.
Figure 13B:
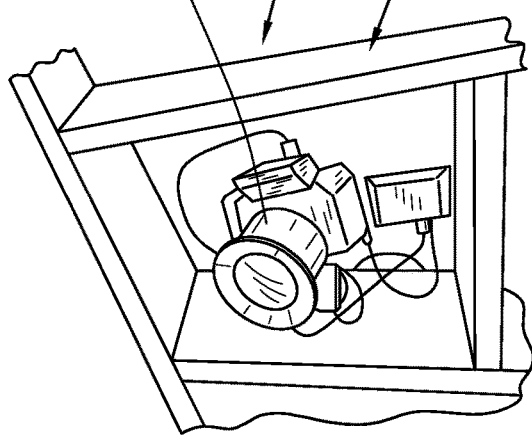
Figure 13C:
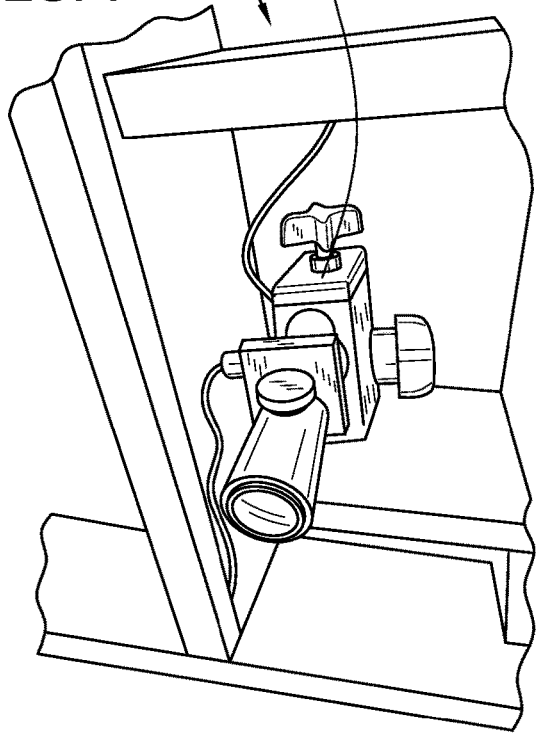

FIGS. 13A-13C are perspective views showing a specific embodiment of a domed photographic booth showing a portion of the dome structure wall and ceiling showing the position of the image capture cameras (top down, side wall) 80 and a tracking camera 82. In a specific embodiment, the tracking camera 82 is made from parts of two different web cameras and a fisheye lens for an iPhone. In other embodiments, this is an off-the-shelf security camera used for tracking. The tracking camera 82 runs at 10 to 60, and in some instances 30 frames per second (fps) and covers a view of 120-180 degrees. Super long camera trigger runs have been made by converting the trigger cables into Ethernet cables and back again into trigger cables at the camera's mounting location. In an embodiment camera flip boxes or shutters may obscure cameras when not in use and flip open when the camera is in use. The shutter color will match the surface the camera is embedded in as shown in FIG. 5A.

Figure 14:
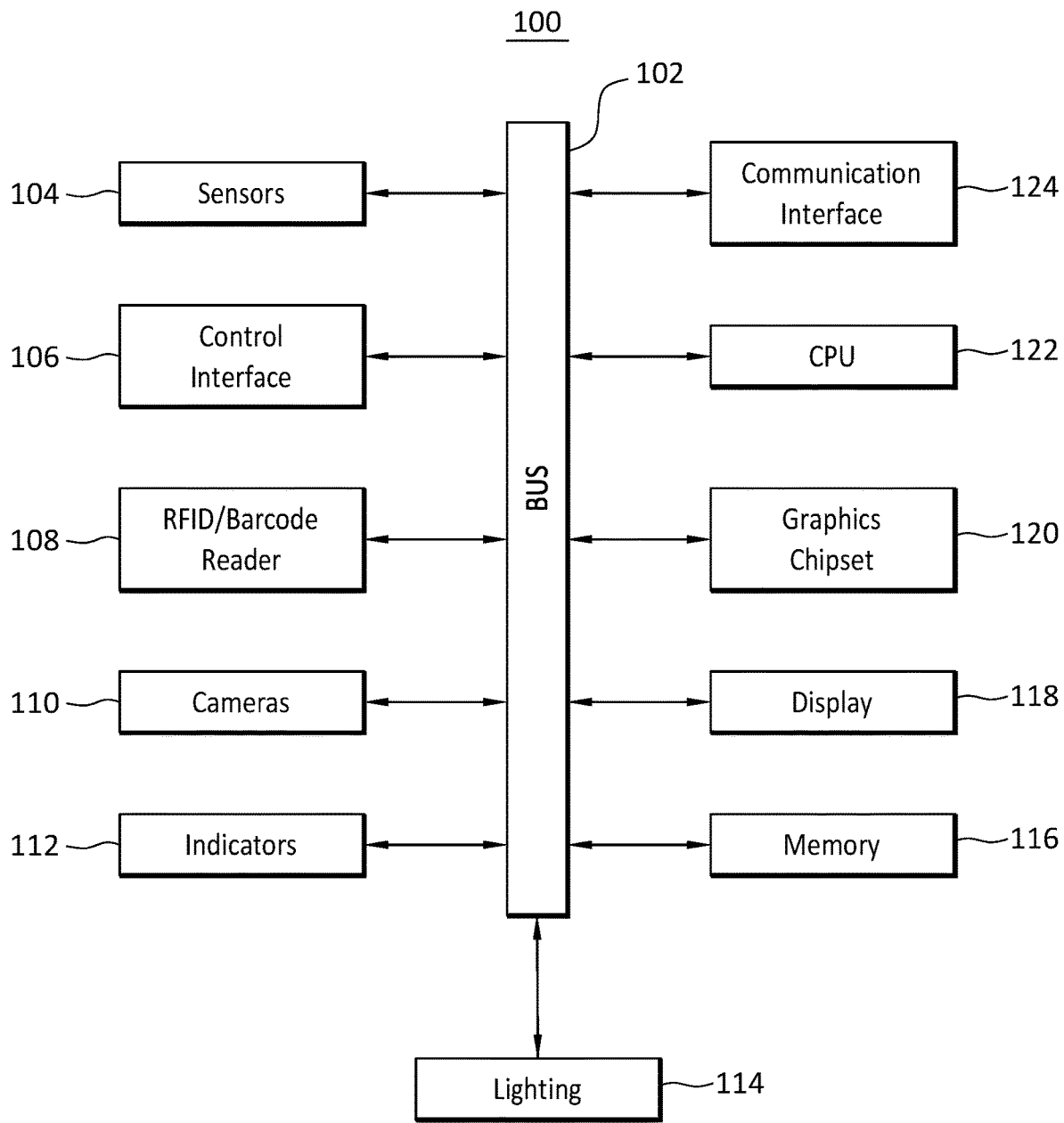
FIG. 14 is a system block diagram of the major components for photographing vehicles in accordance with embodiments of the invention.

FIG. 14 is a system block diagram 100 of the major components for photographing vehicles. A central process unit (CPU) 122 coordinates and controls the overall operation of the photographing system 100 that may be operated in the domed structure 30, and the other photographic chambers disclosed above. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of read-only memory ROM and random access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID/barcode 108 is a reader that detects and interprets tags mounted to vehicles or driver identification (ID) cards. Cameras 110 and lighting 114 are controlled and sequenced by the CPU 122. Indicators 112 provide visual feedback to system users. In inventive embodiments, the central process unit (CPU) 122, or master and node computers, in the case of many cameras in use—these processing nodes speedup download and system throughput, and the CPU 122 coordinates and controls the plurality of cameras in the circular domed structure 30. In specific inventive embodiments, a communication interface connects the plurality of cameras via one or more of wired and wireless links, optical drives, universal serial bus (USB), flash memory slot, and combinations thereof for receiving and sending data.

Figure 15:
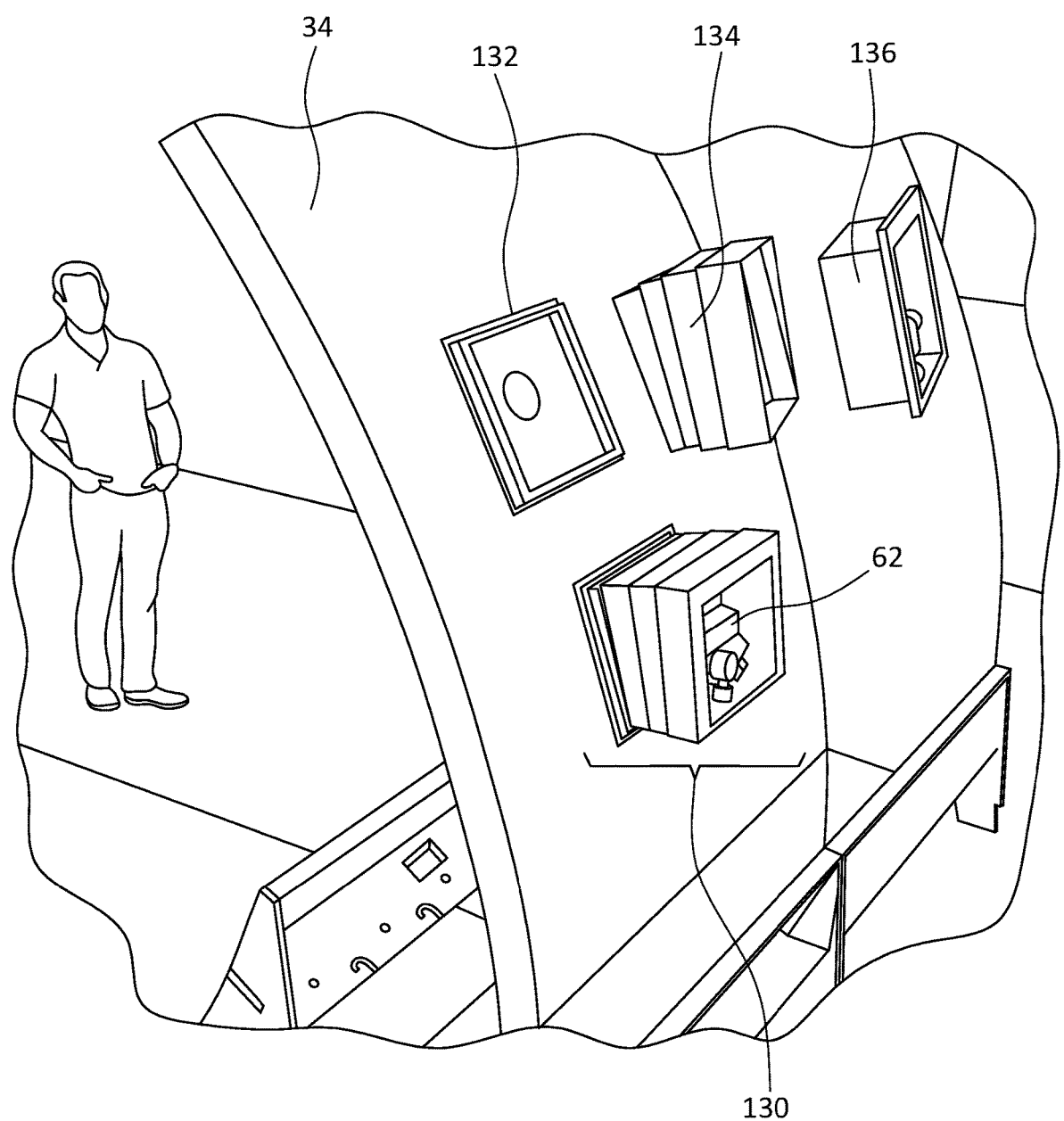
FIG. 15 illustrates a modular camera mounting system in accordance with an embodiment of the invention.

FIG. 15 illustrates a modular camera mounting system 130 that allows the installer of a photographic booth illustratively including the domed structure 30 to set the angle and tilt of each camera (62, 80, 82), and then allows untrained operators to swap out cameras (62, 80, 82) without the need to rearm the cameras. The modular camera mounting system 130 has a flexible accordion extension 134 that locks into a frame 132 installed in the panel wall 34 of the photographic booth. The camera (62, 80, 82) is mounted square and plumb in a camera and electronics module 136 that attaches to the accordion extension 134. The module 136 may also have lighting elements. The accordion extension 134 allows the camera module 136 to pan and tilt and may be locked in position during installation, and this allows camera modules 136 to be swapped out without the need to be re-aimed.

Figure 16:
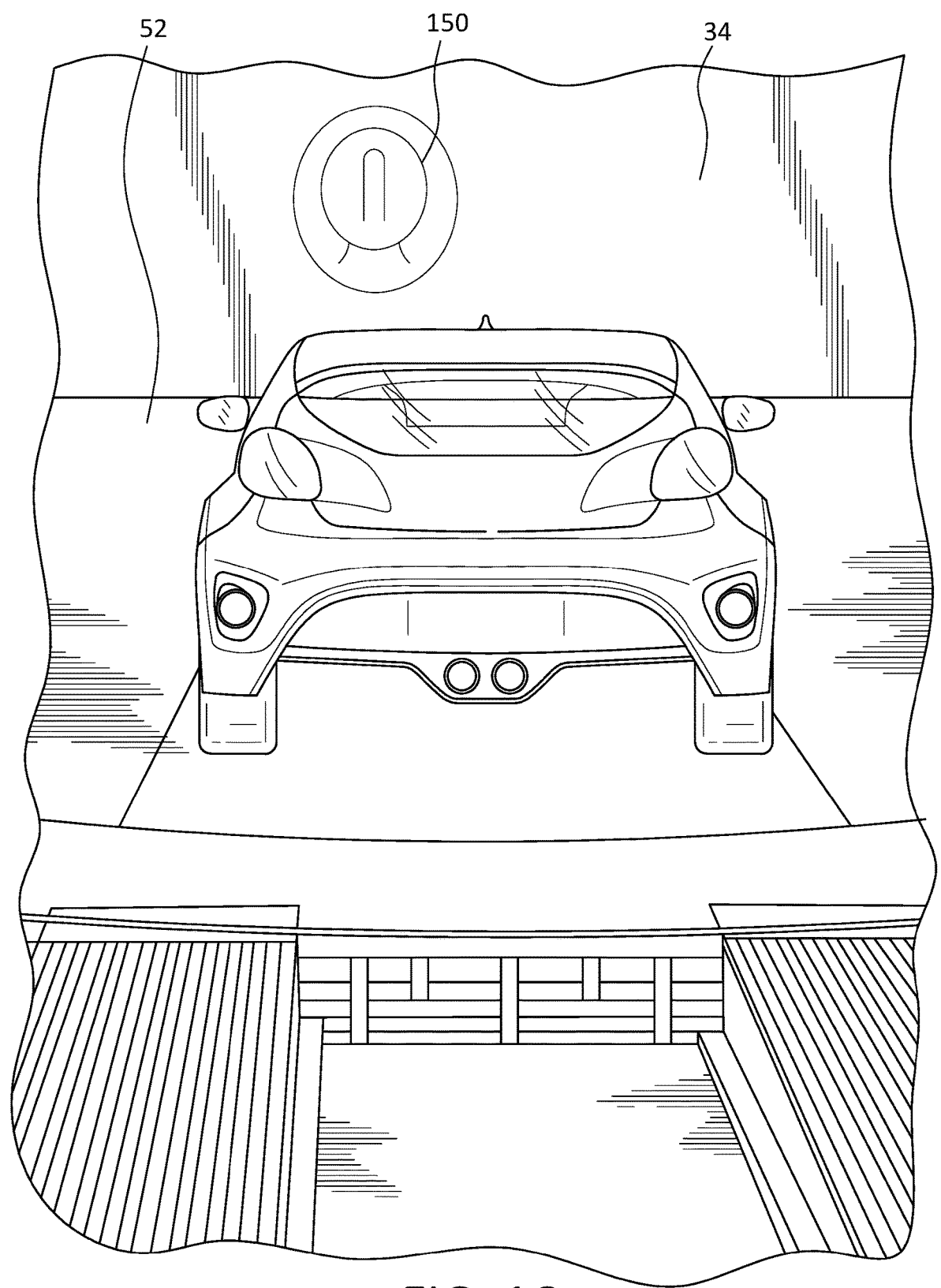
FIG. 16 is a photograph showing a projection system in accordance with an embodiment of the invention.

FIG. 16 is a photograph showing a projection system display 150. In a specific inventive embodiment, the projection system display 150 is projected on to the wall 34 of the photographic chamber, and provides the view from the top down camera to aid a driver in centering a vehicle in the photographic chamber. The projection system may also be used in conjunction with the vehicle data base to show a photographer step by step which interior and details photos that are needed for that vehicle. For example, a sample graphic or photograph of the next shot needed is projected along with notes on which lighting preset to use, Furthermore, the projection may provide consistency reminders like "straighten the steering wheel". The projection system may also display a running clock or countdown clock to keep the photographer moving according to the facilities production schedule. If what is being projected is also being recorded, the operator's performance can be evaluated against the direction given by the automated system. It is noted that since the flash units for the image taking cameras are so much brighter than the projected image, the projection image is washed out and never shows up in the photographs.

As a person skilled in the art will recognize from the previous detailed description and from the figures and claims, modifications and changes can be made to the preferred embodiments of the invention without departing from the scope of this invention defined in the following claims.

I claim:

1. A photographic chamber comprising:
   one or more curved frames arranged in a convex shape;
   one or more cameras coupled to the one or more curved frames, the one or more cameras configured for photographing a vehicle in the photographic chamber;
   one or more lighting elements configured to cast bounce lighting onto a surface of the vehicle;
   one or more walls arranged on a floor of the photographic chamber configured to create a contrast break line wrapped around an entirety of the vehicle in the photographic chamber; and
   a door comprising at least one of the one or more walls or the one or more curved frames.

2. The photographic chamber of claim 1, wherein the contrast break line is generated using subtractive lighting.

3. The photographic chamber of claim 1, wherein the one or more curved frames comprise a contoured support that provides internal structure for the one or more walls.

4. The photographic chamber of claim 1, wherein the one or more curved frames comprise a well area for placement of the one or more lighting elements.

5. The photographic chamber of claim 1, wherein, when arranged in the convex shape, the one or more curved frames create a domed ceiling.

6. The photographic chamber of claim 1, wherein the one or more curved frames comprise two or more portions that are reversibly coupled together.

7. The photographic chamber of claim 1, wherein the contrast break line accents one or more contours on the surface of the vehicle.

8. A method for using a photographic chamber comprising:
   moving a vehicle into the photographic chamber comprising:
      one or more curved frames arranged in a convex shape;
      one or more cameras coupled to the one or more curved frames;
      one or more lighting elements configured to cast bounce lighting onto a surface of the vehicle;
      one or more walls arranged on a floor of the photographic chamber configured to create a contrast break line wrapped around an entirety of the vehicle in the photographic chamber; and
      a door comprising at least one of the one or more walls or the one or more curved frames;
   moving the door into a closed position;
   generating the contrast break line; and
   capturing one or more photographs of the vehicle.

9. The method of claim 8, wherein the generating the contrast break line comprises generating the contrast break line using subtractive lighting.

10. The method of claim 8, wherein the one or more curved frames comprise a contoured support that provides internal structure for the one or more walls.

11. The method of claim 8, wherein the one or more curved frames comprise a well area for placement of the one or more lighting elements.

12. The method of claim 8, wherein, when arranged in the convex shape, the one or more curved frames create a domed ceiling.

13. The method of claim 8, wherein the one or more curved frames comprise two or more portions that are reversibly coupled together.

14. The method of claim 8, wherein the contrast break line accents one or more contours on the surface of the vehicle.

15. A method of constructing a photographic chamber comprising:
   arranging one or more curved frames in a convex shape;
   coupling one or more cameras to the one or more curved frames, the one or more cameras configured for photographing a vehicle in the photographic chamber;
   illuminating one or more lighting elements configured to cast bounce lighting onto a surface of the vehicle;
   arranging one or more walls on a floor of the photographic chamber;
   creating a contrast break line wrapped around an entirety of the vehicle in the photographic chamber; and
   providing a door comprising at least one of the one or more walls or the one or more curved frames.

16. The method of claim 15, wherein the creating the contrast break line occurs by using subtractive lighting.

17. The method of claim 15, wherein the one or more curved frames comprise a contoured support that provides internal structure for the one or more walls.

18. The method of claim 15, wherein the one or more curved frames comprise a well area for placement of the one or more lighting elements.

19. The method of claim 15, wherein, when arranged in the convex shape, the one or more curved frames create a domed ceiling.

20. The method of claim 15, wherein the contrast break line accents one or more contours on the surface of the vehicle.

* * * * *